US012657947B2

(12) United States Patent
Weber et al.

(10) Patent No.: US 12,657,947 B2
(45) Date of Patent: Jun. 16, 2026

(54) DEVICES AND METHODS FOR PROCESSING EYEGLASS PRESCRIPTIONS

(71) Applicant: Carl Zeiss Vision International GmbH, Aalen (DE)

(72) Inventors: Tobias Weber, Oberkochen (DE); Paul Bilsdorfer, Oberkochen (DE); Dieter Braunger, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 436 days.

(21) Appl. No.: 18/452,683

(22) Filed: Aug. 21, 2023

(65) Prior Publication Data

US 2023/0394864 A1 Dec. 7, 2023

Related U.S. Application Data

(63) Continuation of application No. PCT/EP2022/054195, filed on Feb. 21, 2022.

(30) Foreign Application Priority Data

Feb. 22, 2021 (EP) ...................................... 21158494

(51) Int. Cl.
| | |
|---|---|
| *G06V 30/414* | (2022.01) |
| *G06V 30/19* | (2022.01) |
| *G06V 30/413* | (2022.01) |

(52) U.S. Cl.
CPC ........ *G06V 30/414* (2022.01); *G06V 30/1916* (2022.01); *G06V 30/413* (2022.01)

(58) Field of Classification Search
CPC .......... G02C 7/02; G02C 7/024; G02C 7/025; G02C 7/027; G06V 30/412; G06V 30/413; G06V 30/414; G06V 30/1916
See application file for complete search history.

(56) References Cited

U.S. PATENT DOCUMENTS

| | | | |
|---|---|---|---|
| 6,108,444 A | 8/2000 | Syeda-Mahmood |
| 7,092,870 B1 | 8/2006 | Chen et al. |

(Continued)

FOREIGN PATENT DOCUMENTS

| | | |
|---|---|---|
| CN | 110399798 A | 11/2019 |
| CN | 110399845 A | 11/2019 |

(Continued)

OTHER PUBLICATIONS

Office Action by the Australian Patent Office issued in AU 2022221990, which is a counterpart hereof, mailed on Nov. 7, 2024.

(Continued)

*Primary Examiner* — Daniel G Mariam
(74) *Attorney, Agent, or Firm* — Qubit IP, PLLC

(57) ABSTRACT

A processing device allows processing standard or non-standard spectacle lens prescription documents drafted in a plurality of fashions and provided by eye care professionals, such as opticians, or by end consumers in one of a plurality of languages to determine the data related to the refractive values in a reliable, scalable, and automated fashion. Data related to refractive values is determined from the spectacle lens prescription document. A processing device for determining data related to the refractive values determine at least one pattern containing the data related to the refractive values from an electronic representation of the at least one spectacle lens prescription document, and determines text containing the data related to the refractive values from the electronic representation of the at least one spectacle lens prescription document.

69 Claims, 11 Drawing Sheets

(56) References Cited

U.S. PATENT DOCUMENTS

| | | | |
|---|---|---|---|
| 7,499,588 B2 | 3/2009 | Jacobs et al. | |
| 7,499,891 B2 | 3/2009 | Hitt | |
| 7,880,730 B2 | 2/2011 | Robinson et al. | |
| 8,352,400 B2 | 1/2013 | Hoffberg | |
| 10,749,929 B2 | 8/2020 | Stephkov et al. | |
| 2005/0278229 A1 | 12/2005 | Igo | |
| 2015/0055085 A1 | 2/2015 | Fonte et al. | |
| 2015/0316787 A1* | 11/2015 | Tanaka | G05B 19/406 |
| | | | 700/109 |
| 2016/0353985 A1 | 12/2016 | Haddadi et al. | |
| 2019/0362829 A1 | 11/2019 | Simpson | |

FOREIGN PATENT DOCUMENTS

| | | | |
|---|---|---|---|
| CN | 111435407 A | 7/2020 | |
| EP | 3200123 A1 | 8/2017 | |
| EP | 3647859 A1 | 5/2020 | |
| JP | 50140022 A | 11/1975 | |
| JP | 59002191 A | 1/1984 | |
| JP | 61213982 A | 9/1986 | |
| JP | 61233881 A | 10/1986 | |
| KR | 20050054713 A | 6/2005 | |
| WO | 02073535 A2 | 9/2002 | |
| WO | 2019092672 A2 | 5/2019 | |

OTHER PUBLICATIONS

Office Action by the Australian Patent Office issued in AU 2022221990, which is a counterpart hereof, mailed on May 9, 2025.

D. W. Embley et al., "Table-processing paradigms: a research survey," International Journal of Document Analysis, vol. 8, No. 2, pp. 66 to 86, May 9, 2006.

Youtube video: "OCR Prescription Scanner", available at: www.youtube.com/watch?v=9mjecfUHT80, 1 sample slide provided, last accessed Jan. 21, 2021.

Industrial Norm "Ophthalmic optics—Spectacle lenses—Vocabulary (ISO 13666:2019)," Feb. 2019.

Homepage of Freelancer (R), available at the url: www.freelancer.com/u/sudarsanghosh15/portfolio/Medical-Prescription-OCR-5024816?w=f&ngsw-bypass=, (last accessed Jan. 21, 2021).

European Search Report issued in EP 21158494.1, to which this application claims priority, mailed Jul. 30, 2021.

International Search Report and Written Opinion issued in PCT/EP2022/054195, to which this application claims priority, mailed Jun. 22, 2022.

Office Action by the European Patent Office (EPO) issued in EP 21158494.1, to which this application claims priority, mailed on Mar. 15, 2023.

International Preliminary Report on Patentability issued in PCT/EP2022/054195, to which this application claims priority, mailed May 12, 2023.

* cited by examiner

DEVICES AND METHODS FOR PROCESSING EYEGLASS PRESCRIPTIONS

CROSS REFERENCE TO RELATED APPLICATIONS

This application is a continuation application of international patent application PCT/EP2022/054195, filed on Feb. 21, 2022 and designating the U.S., which claims priority to European patent application EP 21 158 494.1, filed on Feb. 22, 2021, both of which are hereby incorporated by reference in their entireties.

TECHNICAL FIELD

The present disclosure relates to a processing device, a computer-implemented method and a related computer program for determining data related to refractive values from at least one spectacle lens prescription document, to a system, a computer-implemented method and a related computer program for processing at least one spectacle lens prescription document and to a method for producing at least one spectacle lens based on the data related to refractive values as determined from the at least one spectacle lens prescription document.

BACKGROUND

Although standard spectacle lens prescription documents for ophthalmologists exist, eye care professionals, such as opticians, rather use non-standard spectacle lens prescription documents drafted in a plurality of fashions for recording data related to refractive values. After completing, the non-standard spectacle lens prescription document is, usually, forwarded by fax to a spectacle lens manufacturer, at whose site the data are entered manually into a computer system for further processing. Alternatively, the eye care professional can take an image of the completed non-standard spectacle lens prescription document and transmit the image via a computer network to the manufacturer. As a further alternative, the eye care professional can directly enter the data related to the refractive values into a computer system and forward the data via an electronic network to the spectacle lens manufacturer for further processing.

In the online optical retail industry, a consumer is required to provide the prescription data online via a web application or a web site in order to complete a purchase order. However, viewed on a global scale, a large variety of both standard and non-standard spectacle lens prescription documents are used. In practice, there exists a need for an automated handling of the data related to refractive values which are provided on a standard or a non-standard spectacle lens prescription document.

A video posted online and available under the url www.youtube.com/watch?v=9mjecfUHT80, last accessed on Jan. 21, 2021, shows an OCR Prescription Scanner for medical or pharmaceutical prescriptions. However, no further details are disclosed therein.

Further, a freelancer as denominated therein by the attribute "sudarsanghosh 15" discloses in the online video available under the url www.freelancer.com/u/sudarsanghosh15/portfolio/Medic al-Prescription-OCR-5024816?w=f&ngsw-bypass=(downloaded on Feb. 15, 2021) a procedure which is configured to process a doctor's prescriptions provided in a conventional way, i.e., by using pen and paper. From the scanned version of the prescription, a handwritten character recognition device captures the data, i.e., name of patient, symptoms, findings, prescription of medicine, tests, and advice, as handwritten by the doctor. A two-stage-method is used for electronically reading the prescriptions: In a first step denoted as "image segmentation," the scanned version is segmented into a number of blocks, thereby identifying different regions, such as computer printed parts or images, and handwritten texts, wherein the blocks comprising the handwritten texts are considered as regions of interest. In a second step denoted as "handwritten text recognition," words are extracted and characters are identified from the regions of interest which are used as input to this step. However, apart from this description no additional information is provided here.

U.S. Pat. No. 10,749,929 B2 disclose a method implemented by computer means for providing at least part of eyewear equipment adapted to a wearer. The method comprises a wearer data receiving step, a wearer data storing step, an identifier sending step, an eyewear equipment design sending step, an eyewear equipment data receiving step, an eyewear equipment data storing step, and an eyewear equipment data sending step.

US 2005/0278229 A1 discloses a web-based system for order and fulfillment of occupational prescription eyewear, which includes providing a user account initiation interface, an interface prompting user selection of eyewear components; a prescription form to the user, and a fulfillment of an eyewear order based on user selection of eyewear components and the prescription from such professional and based on receipt of a completed prescription form from a professional qualified to make such prescription.

EP 3 647 859 A1 discloses a method for producing a spectacle lens from a lens material, and including: a marking step of marking an identification mark for identifying the spectacle lens, and a processing information mark which is used to process a lens blank and includes a tray identification 2D code, a tray identification code, a shape line and a position mark by forming a hole or a groove in a convex surface of the lens material by laser; and a concave surface machining processing step of reading the processing information mark, and machining a concave surface of the lens blank based on the read processing information mark.

US 2019/0362829 A1 discloses that an optical management and/or fulfillment system may retrieve patient prescriptions (e.g., from third party records management systems). The optical management and/or fulfillment system may contact patients regarding optical prescriptions. The optical management and/or fulfillment system may fulfill optical prescriptions and/or confirm optical prescriptions (e.g., for third party fulfillment). The optical management and/or fulfillment system may send notifications to individual(s), doctors associated with the individual(s), and/or third party records management systems.

US 2015/055085 A1 discloses systems and methods for creating fully custom products from scratch without exclusive use of off-the-shelf or pre-specified components. A system for creating custom products includes an image capture device for capturing image data and/or measurement data of a user. A computer is communicatively coupled with the image capture device and configured to construct an anatomic model of the user based on the captured image data and/or measurement data. The computer provides a configurable product model and enables preview and automatic or user-guided customization of the product model. A display is communicatively coupled with the computer and displays the custom product model superimposed on the anatomic model or image data of the user. The computer is further configured to provide the customized product model to a manufacturer for manufacturing eyewear for the user in accordance with the customized product model. The manufacturing system is configured to interpret the product model and prepare instructions and control equipment for the manufacturing of the customized product.

David W. Embley et al., *Table processing paradigms: a research survey*, International Journal of Document analysis and recognition (IJDAR), vol. 8, no. 2-3, 9 May 2006, pages 66-86, XP019385667 describes that tables are a ubiquitous form of communication. While everyone seems to know what a table is, a precise, analytical definition of "tabularity" remains elusive because some bureaucratic forms, multicolumn text layouts, and schematic drawings share many characteristics of tables. There are significant differences between typeset tables, electronic files designed for display of tables, and tables in symbolic form intended for information retrieval. Recent research on table composition and table analysis has improved the understanding of the distinction between the logical and physical structures of tables, and has led to improved formalisms for modeling tables.

SUMMARY

In particular with respect to the disclosure by freelancer denominated as sudarsanghosh 15 and by David W. Embley et al., see above, it is therefore an objective of the present disclosure to provide a processing device, a computer-implemented method and a computer program for determining data related to refractive values from at least one spectacle lens prescription document, a system, a computer-implemented method and a computer program for processing at least one spectacle lens prescription document and a method for producing at least one spectacle lens based on the data related to refractive values as determined from the at least one spectacle lens prescription document, which at least partially overcome the limitations of the state of the art.

It is a particular objective of the present disclosure to provide a processing device, a system, a computer-implemented method and a computer program for processing standard or non-standard spectacle lens prescription documents, which can be drafted in a plurality of fashions and may be provided by eye care professionals, such as opticians, or by end consumers in one of a plurality of European and Asian languages, to determine the desired data related to the refractive values therefrom in a reliable, scalable and automated fashion for being used in a subsequent production of at least one spectacle lens.

This problem is solved by a processing device, a computer-implemented method and a computer program for determining data related to refractive values from at least one spectacle lens prescription document, a system, a computer-implemented method and a computer program for processing at least one spectacle lens prescription document and a method for producing at least one spectacle lens by determining text containing data related to the values from the electronic representation of the at least one document. Exemplary embodiments, which can be implemented in an isolated fashion or in any arbitrary combination, are discussed in detail in the following description.

In a first aspect, the present disclosure relates to a processing device for determining data related to refractive values from at least one spectacle lens prescription document. According to the present disclosure, the processing device is configured to determine at least one pattern comprising the data related to the refractive values from an electronic representation of at least one spectacle lens prescription document; and determine text comprising the data related to the refractive values from the electronic representation of the at least one spectacle lens prescription document, wherein the processing device is configured to determine the data related to the refractive values by identifying and using a surface distribution of the at least one pattern comprising the data related to the refractive values over the electronic representation of the at least one spectacle lens prescription document.

As used herein, the term "processing" refers to applying at least one algorithm in order to extract data from at least one input file, wherein the data is provided, such as for further processing, as at least one output file. As generally used, the term "data" refers to at least one piece of information. With particular regard to the present disclosure, the at least one piece of information is related to refractive values. Herein, the at least one algorithm may be configured to determine the data related to refractive values by evaluating the at least one input file according to a predefined scheme, wherein, as described below in more detail, artificial intelligence, in particular at least one machine learning algorithm, may also be applied, especially by using a neuronal network.

As generally used, the term "processing device" refers to an apparatus which is designated for determining the data related to refractive values from the at least one input file, which may, typically, be provided to the processing device by at least one input interface, and to provide the data related to the refractive values, such as for further processing, typically by at least one input interface, in particular by using a system as described below in more detail. Specifically, the processing device may comprise at least one of an integrated circuit, in particular an application-specific integrated circuit (ASIC), or a digital processing device, in particular at least one of a digital signal processor (DSP), a field programmable gate array (FPGA), a microcontroller, a microcomputer, a computer, or an electronic communication unit, specifically a smartphone or a tablet. Further components may be feasible, in particular at least one of a data acquisition unit, a preprocessing unit, or a data storage unit. The processing device may, typically, be configured to perform at least one computer program, in particular at least one computer program performing or supporting the determining of the data related to the refractive values from the at least one input file, wherein the processing of the data be performed in a consecutive, a parallel, or a combined fashion.

According to the present disclosure, the processing device is configured to determine data related to refractive values from at least one spectacle lens prescription document. As generally used, the term "determine" or any grammatical variation thereof refers to a process of generating representative results which are, typically, denoted as "data". With particular regard to the present disclosure, the data comprise pieces of information which are related to refractive values of a spectacle lens designated to correct at least one refractive error of at least one eye of a person. Instead of the term "person," a different term, such as "user," "subject," or "wearer," may also be applicable.

In a first regard, the data related to the refractive values actually comprise refractive values which correspond to the at least one refractive error of the at least one eye of the person, which may, in particular, be used for producing at least one spectacle lens which exhibits, based on the refractive values, a dioptric power which is capable of correcting the at least one refractive error of the at least one eye of the person. With particular regard to the present disclosure, the refractive values comprise at least one value for each of a sphere, a cylinder, and an axis (i.e., the cylinder axis) of the spectacle lens, and optionally, at least one further value selected from at a prism, a base, (i.e., the prism base) and an addition. In particular, the refractive values may comprise a first sequence of refractive values assigned to a right spectacle lens to be used for correction of the at least one refractive error of the right eye of a person, also abbreviated to at least one of "OD" or "RT;" and a second sequence of refractive values assigned to a left spectacle lens to be used for correction of the at least one refractive error the left eye of a person, also abbreviated to at least one of "OS" or "LT".

As used herein, the terms "first" or "second" are considered as a description of an element without specifying an order or a chronological sequence and without excluding a possibility that other elements of the same may be present.

Based on standard ISO 13666:2019, also referred to herein as "Standard," Section 3.5.2, the term "spectacle lens" refers to an optical lens which is used for correcting the at least one refractive error of the at least one eye of the person, wherein the optical lens is carried in front of the eye of the person, thereby avoiding a direct contact with the eye of the person. In general, the spectacle lens may be selected from a spherical lens, a spherocylindrical lens, or a prismatic-power lens, each of which could be a single-vision lens, a bifocal lens, a multifocal lens, or a progressive-addition lens, also denoted as a variofocal lens. Further, the term "glasses" refers to an element which comprises two individual spectacle lenses and a spectacle frame, wherein each spectacle lens is prepared for being received by the spectacle frame selected by the person.

As defined in the Standard, Section 3.12.2, the term "spherical power," usually abbreviated to "sphere" or "sph," refers to a value of a back vertex power of a spherical-power lens, or for a back vertex power in one of two principal meridians of an astigmatic-power lens, depending on a principal meridian chosen for reference.

As defined in the Standard, Section 3.13.7, the term "cylinder," usually abbreviated to "cylinder" or "cyl," refers to an algebraic difference between principal powers with power of the principal meridian chosen for reference being subtracted from the other principal power.

As defined in the Standard, Section 3.13.8, the term "cylinder axis," usually abbreviated to "cyl axis" or "axis," refers to a direction of the principal meridian of a lens whose vertex power is chosen for reference.

As defined in the Standard, Section 3.11.10, the term "prismatic power," usually abbreviated to "prism" refers to a magnitude of a prismatic effect which is a collective name for a prismatic deviation and a prism base setting, wherein the term "prismatic deviation" indicates a change in direction imposed on a ray of light as a result of refraction.

As defined in the Standard, Section 3.11.7, the term "prism base setting," usually abbreviated to "base" refers to a direction of a line from an apex to a base in a principal section of a prism.

As defined in the Standard, Section 3.16.3, the term "addition," also abbreviated to "add," refers to a difference between the vertex power of a near portion and the vertex power of a distance portion in a multifocal or power-variation lens.

As further defined in the Standard, Sections 3.7.1, 3-4, the term "single-vision lens" refers to a particular type of spectacle lens having a single dioptric power, while the terms "bifocal lens" and "multifocal lens" refer to a particular type of spectacle lens comprising two or more portions, respectively, wherein each portion has a different value for the dioptric power.

In a further regard, the data related to the refractive values may, in addition, comprise at least one piece of metadata. As generally used, the term "metadata" refers to a particular piece of data which, compared to the piece of data that directly comprise the refractive values, refers to a different type of data which is, however, related to the piece of data to which the metadata refer to. The at least one piece of metadata may, typically, be selected from at least one of:

an issuance date of the refractive values;

an expiration date of the refractive values;

at least one piece of imprint information about an issuer of the refractive values; and a signature of an issuer of the refractive values.

However, at least one further piece of metadata may also be conceivable, such as a name and, optionally, an address or an age of a customer of whom the indicated refractive values have been determined. Herein, at least one piece of metadata may, in particular, depend on at least one specific regulatory framework, which may be applicable for at least one particular country.

As further used herein, the term "spectacle lens prescription document" is a document which comprises the data related to the refractive values, in particular, the pieces of information as indicated above in more detail, typically on at least on page or a portion thereof, wherein a single page is preferred. Although standard spectacle lens prescription documents exist which are, typically, employed by ophthalmologists for medical purposes, eye care professionals, such as opticians, rather use non-standard spectacle lens prescription documents for recording the data related to the refractive values to be used for producing at least one spectacle lens. As used herein, the term "standard spectacle lens prescription document" refers to a particular type of spectacle lens prescription documents whose content and distribution of the content over the surface of the spectacle lens prescription documents has been defined by a competent body, such as a governmental council, an administrative council, an ophthalmological council, or a manufacturer of spectacle lenses.

Typically, the non-standard spectacle lens prescription documents are drafted in a plurality of fashions, specifically by distributing text which comprises the data related to the refractive values in at least one pattern over the surface of the at least one page or the portion thereof. As used herein, the term "text" refers to a plurality of alphanumeric items as comprised by the at least one spectacle lens prescription document, wherein the term "alphanumeric item" relates to at least one of a letter, a number or a sign, such as a "+"-sign or a "−"-sign being placed in front a number. Further, the term "pattern" refers to a particular structure on the surface of the at least one spectacle lens prescription document which can be identified by the processing device at a particular location on the at least one page or the portion thereof, wherein the particular structure may comprise at least one of text which comprises the desired data related to the refractive values;

text which comprises anything else, such as at least one of a further kind of value, e.g., a pupillary distance, or an explanation to the type of value; or anything else, such as a brand name or a logo of the eye care professional or of a manufacturer of spectacle lenses.

For the purposes of the present disclosure, the text which comprises the desired data related to the refractive values can be further processed, whereas the text which comprises anything else or the particular structure which comprises anything else can be disregarded. As described below in more detail, the pattern may, typically, comprise a sequence of refractive values, in particular one of the first sequence of the refractive values or of the second sequence of the refractive values as defined above.

It is, in particular, emphasized here that the processing device may be configured to determine the at least one pattern comprising the data related to the refractive values from the electronic representation of the at least one spectacle lens prescription document; and determine the text comprising the data related to the refractive values from the electronic representation of the at least one spectacle lens prescription document, in any order, i.e., in the order as given above or in a reverse order. By way of example, the surface distribution of the at least one pattern which comprises the data related to the refractive values can, firstly, be identified from the electronic representation of the at least one spectacle lens prescription document, wherein the text which comprises the data related to the refractive values can, subsequently, be determined from the at last one pattern. Alternatively or in addition, the text which comprises the data related to the refractive values can, firstly, be determined from the electronic representation of the at least one spectacle lens prescription document, wherein the surface distribution of the at least one pattern which comprises the text can, subsequently, be identified from the electronic representation of the at least one spectacle lens prescription document.

In accordance with the present disclosure, it can be demonstrated by analyzing a plurality of different standard and non-standard spectacle lens prescription documents, such as the exemplary documents as presented below in the figures, that the data related to the refractive values are distributed over the surface of the at least one page or the portion thereof in a fashion that determining the text which comprises the data related to the refractive values from the at least one spectacle lens prescription document, such as by applying a text recognition algorithm, specifically by using an optical character recognition algorithm, also abbreviated to "OCR," is not sufficient for determining the data related to the refractive values from the typical non-standard spectacle lens prescription document in a precise manner which is adequate for being used in a prescription of the spectacle lenses for a purpose of producing the at least one spectacle lens.

Rather, it has been recognized that determining the data related to the refractive values from a standard or a non-standard spectacle lens prescription document can considerably be improved, especially for being adequate for the prescription of the spectacle lenses for the purpose of producing the at least one spectacle lens by, additionally, applying at least one pattern recognition algorithm which is configured for determining at least one pattern that comprises the desired data related to the refractive values from the at least one spectacle lens prescription document by identifying and using the surface distribution of the at least one pattern over the surface of the at least one spectacle lens prescription document. The pattern recognition algorithm may, in particular, determine the data related to a first refractive value by performing an evaluation of the relative position of the first refractive value in relation to at least one second refractive value. Thereby, the determination may be independent from any labeling of the first refractive value and of the at least one second refractive value. The label may additionally be considered.

As used herein, the term "surface distribution" refers to a spatial arrangement of the at least one pattern on the surface of the electronic representation of the at least one spectacle lens prescription document, in particular, with regard to a location of each pattern on the at least one page or the portion of the at least one spectacle lens prescription document. In a typical exemplary embodiment, in which the electronic representation of the at least one spectacle lens prescription document comprises at least two different patterns, specifically at least one first pattern comprising the first sequence of the refractive values and at least one second pattern comprising the second sequence of the refractive values, a relative location of each pattern with respect to at least one different pattern can be sufficient for being used as the surface distribution.

As generally used, the term "electronic representation" refers to providing data related to an object in fashion in which the data can be processed by a computer. Typically, the electronic representation of the at least one spectacle lens prescription document can be provided in form of at least one of an image file or a portable document format. As used herein, the term "image file" refers to electronic data comprising a two-dimensional representation of the at least one page or the portion thereof comprising the at least one spectacle lens prescription document, wherein the term "two-dimensional representation" indicates that the electronic data, additionally, comprises at least one piece of spatial information which refers to a location of the at least one pattern comprising the data related to the refractive values over the at least one page or the portion thereof. In a similar fashion, the term "portable document format" refers to both a text comprised by the at least one spectacle lens prescription document and a two-dimensional representation of the location of the text over the at least one page or the portion thereof. Herein, the electronic representation of the location of the text over the at least one page or the portion thereof comprising the at least one spectacle lens prescription document in a two-dimensional manner can contribute, in an advantageous fashion, to the identifying of the surface distribution of the at least one pattern comprising the data related to the refractive values over the surface of the electronic representation of the at least one spectacle lens prescription document.

As already indicated above, the data related to the refractive values as provided by the electronic representation of the at least one spectacle lens prescription document may, in an exemplary embodiment, comprise the at least one first pattern comprising a first sequence of refractive values assigned to a right spectacle lens, and the at least one second pattern comprising a second sequence of refractive values assigned to a left spectacle lens. Herein, each pattern comprising a sequence of refractive values may, typically, comprise, for each spectacle lens, a first value related to a sphere;

a second value related to a cylinder;

a third value related to a cylinder axis;

and, optionally, a fourth value related to a prism;

a fifth value related to a prism base; or

a sixth value related to an addition of the corresponding spectacle lens.

It has further been noted when carefully analyzing the plurality of different standard and non-standard spectacle lens prescription documents, such as the exemplary documents as presented below in the figures, that each pattern comprising a sequence of refractive values comprises the refractive values in an order of the first value followed by the second value followed by the third value, wherein, optionally, the third value may be followed by the fourth value which may be followed by the fifth value which may be followed by the sixth value.

It has further been observed when carefully analyzing the plurality of different standard and non-standard spectacle lens prescription documents, such as the exemplary documents as presented below in the figures, that, when determining the surface distribution of the at least one first pattern comprising the first sequence of the refractive values assigned to the right spectacle lens and of at least one second pattern comprising the second sequence of the refractive values assigned to the right spectacle lens over the electronic representation of the at least one spectacle lens prescription document, the refractive values in each sequence are, typically, arranged in one of the following alternatives:

in a first alternative, the refractive values in each sequence may be arranged in a horizontal fashion on the electronic representation of the at least one spectacle lens prescription document, wherein the at least one first pattern comprising the first sequence of the refractive values assigned to the right spectacle lens may be arranged above the at least one second pattern comprising the second sequence of the refractive values assigned to the left spectacle lens; or in a second alternative, the refractive values in each sequence may be arranged in a vertical fashion on the electronic representation of the at least one spectacle lens prescription document, wherein the at least one first pattern comprising the first sequence of the refractive values assigned to the right spectacle lens may be arranged left of the at least one second pattern comprising the second sequence of the refractive values assigned to the left spectacle lens.

Moreover, the at least one pattern comprising a sequence of refractive values may, in a further exemplary embodiment, selected from at least one first set of refractive values assigned to far vision; or at least one second set of refractive values assigned to near vision for each spectacle lens.

It has further been observed when carefully analyzing the plurality of different standard and non-standard spectacle lens prescription documents, such as the exemplary documents as presented below in the figures, that, when determining the surface distribution of the at least one first set of refractive values assigned to far vision and of the at least one second set of refractive values assigned to near vision over the electronic representation of the at least one spectacle lens prescription document, the refractive values in each sequence are, typically, arranged in one of the following alternatives:

in a first alternative, the refractive values in each sequence may be arranged in a horizontal fashion on the electronic representation of the at least one spectacle lens prescription document, wherein the at least one first set of refractive values assigned to far vision may be arranged above the at least one second set of refractive values assigned to near vision; or in a second alternative, the refractive values in each sequence may be arranged in a vertical fashion on the electronic representation of the at least one spectacle lens prescription document, wherein the at least one first set of refractive values assigned to far vision may be arranged left of the at least one second set of refractive values assigned to near vision.

In a typical exemplary embodiment, the processing device may, further, be configured to validate a content of the data related to the refractive values. As generally used, the term "content" refers to a value or a sense of the alphanumeric items as comprised by the text. As used herein, the term "validating a data content" or any grammatical variation thereof refers to a process, typically denoted as "data content validation process," of confirming whether the content of the data related to the refractive values which have been identified by the processing device from the electronic representation of the at least one spectacle lens prescription document constitute the desired data, specifically whether a particular value obtained in this fashion may constitute a refractive value or a particular piece of metadata, or whether a particular word obtained in this fashion may exhibit a sense that may qualify it as a further particular piece of metadata, or not. As a result, a data content validation process can provide an answer whether the data as identified by the processing of the electronic representation of the at least one spectacle lens prescription document may actually be a valid value or not, wherein the term "valid value" refers to a particular value which is considered as admissible for a further processing of the identified data, while the term "invalid value" refers to a different value which is not considered as admissible for the further processing of the identified data. For further details concerning the data content validation process, reference may be made to the exemplary embodiments as described below.

In an exemplary embodiment, the data content validation process may comprise a step of ascertaining whether a particular refractive value may fall within a first predefined range or not. As generally used, the term "range" refers to an interval of numbers, wherein the term "fall" indicates that a particular number is comprised by the predefined range. As further generally used, the term "ascertaining" refers to a process of confirming whether a predefined condition, such as falling within a predefined range or being provided as a multitude of a predefined value, is met or not. Specifically, the validating of the content of the data related to the refractive values as determined from the electronic representation of the at least one spectacle lens prescription document may comprise ascertaining whether the particular refractive value for each spectacle lens may fall within a first predefined range or not, specifically whether at least one of:

a first value related to a sphere is above −12 dpt and below +12 dpt;

a second value related to a cylinder is above −12 dpt and below +12 dpt;

a third value related to a cylinder axis is above 0° and below 180°;

a fourth value related to a prism is above or equal to 0 dpt and below +10 dpt; or a fifth value related to a prism base is above 0° and below 180° or not.

Alternatively or in addition, the data content validation process may comprise a step of ascertaining whether a particular refractive value may be provided as a multitude of a predefined value or not. Specifically, the validating of the content of the data related to the refractive values as determined from the electronic representation of the at least one spectacle lens prescription document may comprise ascertaining whether at least one refractive value which is given in diopters (dpt), i.e.

the first value related to the sphere;

the second value related to the cylinder; and the fourth value related to the prism is provided as a multitude of 0.25 dpt or not. As generally used, the term "multitude" refers to a factor of ±n, wherein n is a natural number of 1, 2, 3, 4, . . . etc. As a result, this particular kind of refractive values can only assume a value of ±0.25 dpt, ±0.5 dpt., ±0.75 dpt., ±1 dpt, . . . etc. in order to be considered as a valid value being admissible for further processing of the of the data related to this particular kind of refractive values.

Alternatively or in addition, the data content validation process may comprise a step of ascertaining whether a further particular refractive value may fall within a second predefined range or not in an event in which the particular refractive value as defined above falls within the first predefined range. An example thereof is presented in the examples below.

Alternatively or in addition, the data content validation process may comprise a step of ascertaining whether a difference between two particular refractive values may fall within a third predefined range or not. Specifically, the validating of the content of the data related to the refractive values as determined from the electronic representation of the at least one spectacle lens prescription document may comprise ascertaining whether the difference between the first value related to the sphere for the left eye and the first value related to the sphere for the right eye; or the difference between the second value related to the cylinder for the left eye and the second value related to the cylinder for the right eye may be below 2 dpt nor not.

Alternatively or in addition, the data content validation process may comprise a step of ascertaining whether a particular piece of metadata may correspond to an expected form and content nor not, specifically at least one of whether a period of time which has passed since an issuance date of the refractive values may fall within a predefined reliability range;

whether an expiration date of the refractive values has may have passed;

whether at least one piece of imprint information about of an issuer of the refractive values may refer to an existing optician; or whether a signature of an issuer of the refractive values may be valid, or not. For a possible further piece of metadata at least one further data content validation step may also be conceivable. As indicated above, at least one piece of metadata may, in particular, depend on at least one specific regulatory framework, which may be applicable for at least one particular country.

Alternatively or in addition, the data content validation process may comprise at least one further step which may be adapted to the particular piece of data being which may be subject to data content validation.

In an embodiment in which the validation process may fail by generating an invalid value as defined above, in particular since a particular text as comprised by at least one particular pattern cannot be recognized by using text recognition as a valid value; or the data content validation process may discover an invalid value as described above or below in more detail, at least one of a plurality of actions may be performed, in particular, selected from at least one of displaying an error message to a user;

performing a manual validation procedure by a human person at the manufacturer;

contacting the issuer of the at least one spectacle lens prescription document;

requesting a new spectacle lens prescription document.

However, further kinds of actions may also be conceivable.

In an exemplary embodiment in which the validation process may fail by generating an invalid value as defined above the following sequence of actions may be performed in the following sequence:

displaying an error message to a human person at the manufacturer;

performing a manual validation procedure by the human person at the manufacturer;

the human person at the manufacturer contacting the issuer of the at least one spectacle lens prescription document if the manual validation procedure fails;

requesting a new spectacle lens prescription document from the issuer.

In a typical exemplary embodiment, the processing device may, further, be configured to execute at least one training of at least one step of any one of the methods as disclosed herein. As generally used, the term "training" indicates that a performance of a particular method step is improved during a training phase by providing a plurality of training data sets and executing them by the particular method step. Herein each training data set which is used for a training purpose resembles an expected data set, such as an electronic representation of a particular spectacle lens prescription document, which, however, comprises a known content. The particular method step is, then, performed with the particular training data set, wherein the result for the content as obtained in this fashion is adjusted to the known content of the particular training data set. Herein, a plurality of training data sets is iteratively applied during the training phase in order to improve an approximation of the result as achieved during the execution of the particular method step, specifically by repeated the training of the particular method step until a deviation between the content as obtained by executing the particular method step and the known content as comprised by each training data set may be below a threshold. After the training phase, the content as obtained by executing the particular method step can reasonably be expected to approximate the known content in the same manner as achieved during the training phase. In this fashion, a more accurate determination of the content of the expected data set can be obtained during the training phase. Thus, after the training phase, the desired performance of the particular method step may be acquired.

As already indicated above, the determining of the data related to the refractive values from the electronic representation of the at least one spectacle lens prescription document may be performed in accordance with a predefined scheme, however, artificial intelligence, in particular machine learning, may also be applied, especially by using a neuronal network. As generally used, the term "machine learning" refers to a process of applying artificial intelligence to automatically generate a statistical model for classification or regression. A machine learning algorithm configured to generate the desired model based on a large number of training data sets can, typically, be used. Herein, the machine learning algorithm can be a supervised algorithm or a self-learning algorithm. The machine learning algorithm can use and/or comprise a neural network, which may, typically, be developed into a trained neural network by using the at least one training data set. The neural network may comprise at least one element selected from hierarchical decision trees, Hough forest, regression forest, Convolutional Neural Network (CNN), Deep Neural Network (DNN) Residual Neural Network, Pixel-wise Voting, Pixel-wise Fusion Network, Deep learning. Alternatively or additionally, the use of at least one other artificial intelligence method, typically a kernel method, especially a Support Vector Machine (SVM), may also be feasible.

In this typical exemplary embodiment, the processing device may, specifically, be configured to execute at least one training of the determining of the at least one pattern comprising the data related to the refractive values from the electronic representation of the at least one spectacle lens prescription document. For this purpose, the following sub-steps may be, typically, be performed:

providing a plurality of training spectacle lens prescription documents each comprising known text comprising the data related to the refractive values;

determining a preliminary text from the electronic representation of a particular spectacle lens prescription document; and adjusting the preliminary text as determined from the electronic representation of the particular spectacle lens prescription document to the known text, wherein the training is repeated until a deviation between the preliminary text and the known text is below a threshold.

Alternatively or in addition, the processing device may, specifically, be configured to execute at least one training of the determining of the text comprising the data related to the refractive values from the at least one pattern. For this purpose, the following sub-steps may be, typically, be performed:

providing a plurality of electronic representations of training spectacle lens prescription documents each comprising a known surface distribution of particular patterns over the electronic representation of a particular training spectacle lens prescription document;

determining a preliminary surface distribution of the particular patterns over the electronic representation of the particular training spectacle lens prescription document; and adjusting the preliminary surface distribution of the particular patterns to the known surface distribution of the particular patterns over the electronic representation of the particular training spectacle lens prescription document, wherein the training is repeated until a deviation between the preliminary surface distribution and the known surface distribution of the particular pattern is below a threshold.

Alternatively or in addition, the processing device may, specifically, be configured to execute at least one training of the validating of the content of the data related to the refractive values as determined from the electronic representation of the at least one spectacle lens prescription document. For this purpose, the following sub-steps may be, typically, be performed:

providing a plurality of the electronic representations of training spectacle lens prescription documents each comprising known data related to refractive values;

determining preliminary data related to refractive values from the electronic representation of a particular training spectacle lens prescription document; and adjusting the preliminary data related to refractive values to the known data related to refractive values, wherein the training is repeated until a deviation between the preliminary data related to refractive values and the known data related to refractive values is below a threshold. For further details with regard to the training, reference may be made to the description above.

In a typical exemplary embodiment, the processing device, may, further, be configured to preprocess the electronic representation of the at least one spectacle lens prescription document. Herein, the preprocessing may, in particular, comprise validating a quality of the electronic representation of the at least one spectacle lens prescription document. As used herein, the term "quality" refers to a readability of the electronic representation of the at least one spectacle lens prescription document, specifically of the at least one of an image file or the portable document format file comprising the electronic representation of the at least one spectacle lens prescription document. Herein, the term "readability" refers to a possibility of easily recognizing both the at least one pattern and at least one text within the electronic representation of the at least one spectacle lens prescription document by the at least one processing device as a consequence of providing sufficient structure within the electronic representation of the at least one spectacle lens prescription document.

Alternatively or in addition, the preprocessing may comprise classifying the at least one spectacle lens prescription document into one of at least two classes, wherein each class refers to a different type of spectacle lens prescription document. As used herein, the term "classifying" or any grammatical variation thereof refers to a process, typically denoted as "classification process," of assigning a particular spectacle lens prescription document to a predefined type of spectacle lens prescription document. Specifically, the type of spectacle lens prescription document can be selected from one of a machine written spectacle lens prescription document in table format;

a machine written spectacle lens prescription document without the table format;

a machine written spectacle lens prescription document having at least one data field which comprises at least one piece of data in a handwritten manner; or a handwritten spectacle lens prescription document.

Herein, the machine written spectacle lens prescription document in table format may be or comprise a consumer card. As generally used, the tem "consumer card" relates to a particular kind of spectacle lens prescription document which is issued for a particular person summarizing the refractive values of the eyes of the particular person in machine written form, wherein each piece of data is arranged in accordance with a table format. In an advantageous fashion, the determining of the at least one pattern and/or the text as comprised by the at least one spectacle lens prescription document could be facilitated based on a result of the classification process.

In this typical exemplary embodiment, the processing device, may, specifically, be configured to execute at least one training of the preprocessing of the electronic representation of the at least one spectacle lens prescription document. For this purpose, the following sub-steps may be, typically, be performed:

providing a plurality of electronic representations of train-
ing spectacle lens prescription documents each com-
prising known data related to refractive values;
determining preliminary data related to refractive values
from the electronic representation of a particular train-
ing spectacle lens prescription document; and
adjusting the preliminary data related to refractive values
to the known data related to refractive values,
wherein the training is repeated until a deviation between the
preliminary data related to the refractive values and the
known data related to the refractive values is below a
threshold. For further details with regard to the training,
reference may be made to the description above.

In a further aspect, the present disclosure relates to a
system for processing at least one spectacle lens prescription
document. As generally used, the term "system" refers to a
combination of at least two components each of which is
configured to perform a particular task, wherein, however,
the at least two components may cooperate and/or interact
with each other in order to achieve the desired task.

According to the present disclosure, the system com-
prises:
    at least one input interface configured to receive an
        electronic representation of at least one spectacle lens
        prescription document;
    a processing device as described elsewhere herein; and
    at least one output interface configured to provide the data
        related to the refractive values.

With respect to the processing device, reference can be
made to the description thereof throughout this document.
Further, the processing device may, typically, comprise at
least one communication interface configured to provide
communication with both the at least one input interface and
the at least one output interface. As generally used, the term
"communication interface" refers a transmission channel
being designated for a transmission of data. Typically, the
communication interface may be arranged as a unidirec-
tional interface which is configured to forward at least one
piece of data into a single direction, from the at least one
input interface to the processing device, or from the pro-
cessing device to the at least one output interface. Alterna-
tively, the communication interface may be arranged as a
bidirectional interface which is configured to forward at
least one piece of data into one of two directions, from a
communication unit, which may comprise both the input
interface and the output interface, to the processing device,
or vice versa. For a purpose of data transmission, the
communication interface may comprise at least one of
wire-bound element or a wireless element, wherein the
wireless element may be configured to operate by using at
least one wireless communication protocol, such as Wi-Fi or
Bluetooth. In a typical exemplary embodiment, the commu-
nication may be or comprise an encrypted data transfer or an
encrypted data exchange. However, a further kind of com-
munication interface may also be feasible.

As generally used, the term "input interface" refers to an
apparatus which is configured to receive an electronic rep-
resentation of at least one input file comprising at least one
piece of data, specifically the electronic representation of the
at least one spectacle lens prescription document. As
described above in more detail, the electronic representation
of the at least one spectacle lens prescription document can,
for this purpose, typically be provided in form of at least one
of an image file or a portable document format, and for-
warded to the processing device for determining the desired
data related to the refractive values. In particular, a single
input interface may be sufficient for this purpose, however, at least one additional input interface may, in general, also
be feasible, such as at least one replacement input interface
unit, or at least two different kinds of input interfaces each
configured to receive a different kind of format of the
electronic representation of the at least one spectacle lens
prescription document.

As further generally used, the term "output interface"
refers to a further apparatus which is configured to provide
at least one output file comprising at least one further piece
of data, specifically the data related to the refractive values
as determined by the processing device, especially for
further processing of the data. Herein, the processing device
may, typically, be configured to provide the data related to
refractive values in form of a structured output file to the at
least one output interface. As generally used, the term
"structured output file" refers to a file in which the pieces of
data follow a predefined arrangement, in particular, in order
to facilitate further processing of the output file by a recipi-
ent, specifically by at least data processing system operating
a manufacturing unit for producing at least one spectacle
lens. In particular, a single output interface may be sufficient
for this purpose, however, at least one additional output
interface may, in general, also be feasible, such as at least
one replacement output interface, or at least one further kind
of output interface configured to provide the received at least
one further piece of data, specifically the data related to the
refractive values as determined by the processing device, in
a different kind of format to a further recipient. Herein, the
further recipient can be selected from a data storage unit,
which may be configured to store a copy of the data related
to the refractive values as determined by the processing
device, or an operator of the system, such as the optician, or
a customer who each may receive a copy of the data related
to the refractive values as determined by the processing
device, possibly each in a different format.

In addition, the at least one additional output interface
may, further, be configured to provide at least one item of
information related to at least one recommended procedure
to a user of the system. Herein, the at least one recom-
mended procedure may be selected from at least one of
reviewing at least one of refractive value or at least one piece
of metadata as provided in the at least one spectacle lens
prescription document, demanding a repeated scanning of
the at least one spectacle lens prescription document, or
increasing an illumination level in a room in which the at
least one spectacle lens prescription document is scanned.
However, a further kind of recommended procedure may
also be feasible. In particular, the at least one additional
output interface may be configured to provide the at least
one recommended procedure to the user of the system in an
electronic, visual, acoustic, tactile or any arbitrary combi-
nation thereof to the recipient, typically in a receptive
manner, i.e., in a manner that a user of the system may be
capable of comprehending the received piece of information
in the desired fashion.

In a typical exemplary embodiment, the system may
comprise or may be implemented by using at least one
mobile communication device. As generally used, the term
"mobile communication device" refers to at least one of a
smartphone, a tablet, or a personal digital assistant, which
can be carried by the person and, can thus, move together
with the person. However, further kinds of mobile commu-
nication devices may also be conceivable. In general, the at
least one mobile communication device may comprise the at
least one input interface, the at least one processing device,
and the at least one output interface. A mobile operating
system running on the at least one mobile communication device may be configured to facilitate a use of software, multimedia functionalities, and communication facilities, such as internet or at least one wireless communications protocol, such as Wi-Fi or Bluetooth.

In particular, the at least one input interface may be selected from at last one of:

at least one communication facility configured to receive at least one spectacle lens prescription document in an electronic fashion;

at least one touchscreen providing access to inputting at least one piece of data as comprised by the at least one spectacle lens prescription document; or at least one of a camera or a scanner configured to generate an image file from the at least one spectacle lens prescription document.

However, a further kind of input interfaces may also be feasible.

Further, the at least one output interface may be selected from at last one of:

at least one communication facility configured to provide the data related to the refractive values as determined by the processing device, specifically in form of the structured output file, to a particular recipient in an electronic fashion, specifically to at least data processing system operating a manufacturing unit for producing at least one spectacle lens especially for further processing of the data, or to at least data processing device, such as used by the optician or the customer, for receiving a copy thereof;

at least one screen configured to provide immediate visual access to at least one of the data related to the refractive values as determined by the processing device, or to at least one item of information related to at least one recommended procedure as described above in more detail, to a recipient, such as the optician or the customer;

at least one microphone configured to provide immediate acoustic access to the at least one item of information related to the at least one recommended procedure to the recipient, such as the optician or the customer; or at least one printer configured to generate a printed copy of the data related to the refractive values as determined by the processing device, such as of the structured output file, to a recipient, such as the optician or the customer.

However, a further kind of output interface may also be feasible.

In a further aspect, the present disclosure relates to a computer-implemented method for determining data related to refractive values from a spectacle lens prescription document. Herein, the method comprises the step of determining data related to refractive values from an electronic representation of the at least one spectacle lens prescription document by determining at least one pattern comprising the data related to the refractive values from the electronic representation of the at least one spectacle lens prescription document; and determining text comprising the data related to the refractive values from the electronic representation of the at least one spectacle lens prescription document, wherein the data related to the refractive values are determined by identifying and using a surface distribution of the at least one pattern over the surface of the electronic representation of the at least one spectacle lens prescription document.

In a further aspect, the present disclosure relates to a computer-implemented method for processing at least one spectacle lens prescription document, wherein the method comprises the following steps:

receiving an electronic representation of at least one spectacle lens prescription document comprising data related to refractive values;

determining the data related to the refractive values from the electronic representation of the spectacle lens prescription document according to the method for determining data related to refractive values from a spectacle lens prescription document as described elsewhere herein;

providing the data related to the refractive values for further processing.

In a typical exemplary embodiment, the method for processing at least one spectacle lens prescription document may, further, comprise a step of at least one of preprocessing the electronic representation of the at least one spectacle lens prescription document, in particular by validating a quality of the electronic representation of the at least one spectacle lens prescription document. In addition, the method for processing the at least one spectacle lens prescription document may, still further, comprise a step of training the preprocessing of the electronic representation of the at least one spectacle lens prescription document.

The above-described methods according to the present disclosure are computer-implemented methods. As generally used, the term "computer-implemented method" refers to a method involving at least one programmable device, particularly, be selected from a mobile communication device, a virtual reality device, or an augmented reality device. However, a further kind of programmable device may also be feasible. Herein, the at least one programmable device may, in particular, comprise or have access to the processing device, wherein at least one of the features of the methods is performed by using at least one computer program. In accordance with the present disclosure, the computer program may be provided on the at least one programmable device, or the at least one mobile communication device may have access to the computer program via a network, such as an in-house network or the internet.

With respect to the present disclosure, the system, in particular the processing device, may, specifically, be configured to use at least one of the following exemplary algorithms for executing the respectively denoted tasks that to be performed during the computer-implemented processing of the electronic representation of the at least one spectacle lens prescription document, in particular during the computer-implemented determining data related to refractive values from the electronic representation of the spectacle lens prescription document:

an algorithm configured for pattern recognition as disclosed in at least one of U.S. Pat. No. 8,352,400 B2, U.S. Pat. No. 7,880,730 B2, U.S. Pat. No. 7,499,891 B2, EP 3 200 123 A1, or WO 02/73535 A2;

an algorithm configured for text recognition based on machine learning as disclosed in at least one of U.S. Pat. No. 7,499,588 B2 or CN110399798 A;

an algorithm configured for text recognition and typo correction as disclosed in CN 111 435 407 A1;

an algorithm configured for handwritten text recognition as disclosed in at least one of JP 50 140 022 A2, JP 59 002 191 A2, JP 61 213 982 A2, or JP 61 233 881 A2:

an algorithm configured for grouping handwritten word segments as disclosed in at least one of U.S. Pat. No.

6,108,444 A, KR 2005/0054713 A1, U.S. Pat. No. 7,092,870 B1, or CN 110 399 845 A1; and/or an algorithm configured for image processing as disclosed in WO 2019/092672 A2.

However, using at least one further algorithm for any one of the indicated tasks or at least one further task may also be feasible.

In a further aspect, the present disclosure relates to a computer program comprising instructions which, when the program is executed by a computer, cause the computer to carry out the methods according to any one of the preceding method embodiments. Specifically, the computer program may be stored on a computer-readable, non-transitory data carrier. Thus, specifically, any one of the method steps as indicated above may be performed by using a computer or a computer network, typically by using a computer program.

In a further aspect, the present disclosure relates to a computer program product having program code means, in order to perform the methods according to the present disclosure when the program is executed on a computer or computer network. Specifically, the program code means may be stored on a computer-readable data carrier.

In a further aspect, the present disclosure relates to a data carrier having a data structure stored thereon, which, after loading into a computer or computer network, such as into a working memory or main memory of the computer or computer network, may execute any one of the methods according to one or more of the embodiments disclosed herein.

In a further aspect, the present disclosure relates to a computer program product with program code means stored on a machine-readable carrier, in order to perform the methods according to one or more of the embodiments disclosed herein, when the program is executed on a computer or computer network. As used herein, the term "computer program product" refers to the program as a tradable product. The product may generally exist in an arbitrary format, such as in a paper format, or on a computer-readable data carrier. Specifically, the computer program product may be distributed over a data network, such as the internet.

In a further aspect, the present disclosure relates to a modulated data signal which comprises instructions readable by a computer system or computer network, for performing any one of the methods according to one or more of the embodiments as disclosed herein.

In a further aspect, the present disclosure relates to a method for producing at least one spectacle lens. Accordingly, the producing of the at least one spectacle lens comprises processing at least one lens blank by using data related to refractive values as determined by the method for determining data related to refractive values from the spectacle lens prescription document, in particular, by using the processing device.

For further details with respect to the methods and the computer program as described herein, reference can be made to the description throughout this document.

With respect to the prior art, the devices and methods for determining data related to refractive values from at least one spectacle lens prescription document according to the present disclosure exhibit the following advantages. In particular, they provide an "ease of use" consumer experience by uploading an image of the spectacle lens prescription document, such as the consumer card, and immediately obtaining the validated results instead of being required to generate manual data entry which is, in general, prone to errors. As a result, prescription can be validated much faster for the end user and an order can immediately be released in order to commence earlier with the production of the spectacle lenses. Further, the devices and methods according to the present disclosure allow processing standard or non-standard spectacle lens prescription documents which may be drafted in a plurality of fashions and may be provided by eye care professionals, such as opticians, or by end consumers in one of a plurality of European and Asian languages, in particular selected from one of English, French, Italian, German, Spanish, Mandarin, Japanese and Korean. Further languages seem to be feasible. As result, they are highly scalable to varying demands viewed on a global scale. The desired data related to the refractive values can be determined in a reliable and automated fashion. Instead of requiring back office people for such a task, the devices and methods according to the present disclosure provide an efficient solution by automatically validating the desired data.

As used herein, the terms "have," "comprise" or "include" or any arbitrary grammatical variations thereof are used in a non-exclusive way. Thus, these terms may refer to both a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

As further used herein, the terms "typically," "more typically," "particularly," "more particularly," or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in this way with other features of the disclosure.

Summarizing, the following Embodiments are particularly preferred within the scope of the present disclosure:

Clause 1: A processing device for determining data related to refractive values from at least one spectacle lens prescription document, wherein the processing device is configured to determine at least one pattern comprising the data related to the refractive values from an electronic representation of the at least one spectacle lens prescription document; and determine text comprising the data related to the refractive values from the electronic representation of the at least one spectacle lens prescription document, wherein the processing device is configured to determine the data related to the refractive values by identifying and using a surface distribution of the at least one pattern comprising the data related to the refractive values over the electronic representation of the at least one spectacle lens prescription document.

Clause 2: The processing device according to the preceding embodiment, wherein the processing device is configured to determine the text comprising the data related to the refractive values from the at last one pattern.

Clause 3: The processing device according to any one of the preceding embodiments, wherein the data related to the refractive values comprises a first sequence of refractive values assigned to a right spectacle lens; and a second sequence of refractive values assigned to a left spectacle lens.

Clause 4: The processing device according to the preceding embodiment, wherein each sequence of the refractive values comprises a first value related to a sphere;

a second value related to a cylinder; and a third value related to a cylinder axis of the corresponding spectacle lens.

Clause 5: The processing device according to the preceding embodiment, wherein each sequence of the refractive values comprises the refractive values in an order of the first value followed by the second value followed by the third value.

Clause 5: The processing device according to any one of the two preceding embodiments, wherein at least one of the sequences of the refractive values further comprises at least one of a fourth value related to a prism;

a fifth value related to a prism base; or a sixth value related to an addition of the corresponding spectacle lens.

Clause 6: The processing device according to the preceding embodiment, wherein each sequence of the refractive values comprises the refractive values in an order of the first value followed by the second value followed by the third value followed by the fourth value followed by the fifth value followed by the sixth value.

Clause 7: The processing device according to any one of the five preceding embodiments, wherein the processing device is configured to determine and use the surface distribution of a first pattern comprising the first sequence of the refractive values assigned to the right spectacle lens and of a second pattern comprising the second sequence of the refractive values assigned to the left spectacle lens over the electronic representation of the at least one spectacle lens prescription document.

Clause 8: The processing device according to the preceding embodiment, wherein the refractive values in each sequence are arranged in a horizontal fashion on the electronic representation of the at least one spectacle lens prescription document, wherein the first pattern comprising the first sequence of the refractive values assigned to the right spectacle lens is arranged above the second pattern comprising the second sequence of the refractive values assigned to the left spectacle lens; or in a vertical fashion on the electronic representation of the at least one spectacle lens prescription document, wherein the first pattern comprising the first sequence of the refractive values assigned to the right spectacle lens is arranged left to the second pattern comprising the second sequence of the refractive values assigned to the left spectacle lens.

Clause 9: The processing device according to any one of the seven preceding embodiments, wherein each sequence of the refractive values comprises for each spectacle lens a first set of refractive values assigned to far vision; and a second set of refractive values assigned to near vision.

Clause 10: The processing device according to the preceding embodiment, wherein the refractive values in each sequence are arranged in a horizontal fashion on the electronic representation of the at least one spectacle lens prescription document, wherein the first set of refractive values assigned to far vision is arranged above the second set of refractive values assigned to near vision; or in a vertical fashion on the electronic representation of the at least one spectacle lens prescription document, wherein the first set of refractive values assigned to far vision is arranged left to the second set of refractive values assigned to near vision.

Clause 11: The processing device according to any one of the preceding embodiments, wherein the data related to the refractive values further comprises at least one piece of metadata.

Clause 12: The processing device according to the preceding embodiment, wherein the at least one piece of metadata is selected from at least one of an issuance date of the refractive values;

an expiration date of the refractive values;

at least one piece of imprint information about an issuer of the refractive values; or a signature of an issuer of the refractive values.

Clause 13: The processing device according to any one of the preceding embodiments, wherein the processing device is further configured to execute at least one training of at least one of the determining of the at least one pattern comprising the data related to the refractive values from the electronic representation of the at least one spectacle lens prescription document; or the determining of the text comprising the data related to the refractive values from the at least one pattern.

Clause 14: The processing device according to any one of the preceding embodiments, wherein the processing device is further configured to validate a content of the data related to the refractive values.

Clause 15: The processing device according to the preceding embodiment, wherein the processing device is further configured to execute at least one training of the validating of a content of the data related to the refractive values.

Clause 16: The processing device according to any one of the preceding system embodiments, wherein the processing device is further configured to preprocess the electronic representation of the at least one spectacle lens prescription document.

Clause 17: The processing device according to the preceding system embodiment, wherein the preprocessing of the electronic representation of the at least one spectacle lens prescription document comprises validating a quality of the electronic representation of the at least one spectacle lens prescription document.

Clause 18: The processing device according to any one of the two preceding embodiments, wherein the preprocessing of the electronic representation of the at least one spectacle lens prescription document comprises classifying the at least one spectacle lens prescription document into one of at least two classes, wherein each class refers to a different type of spectacle lens prescription document.

Clause 19: The processing device according to any one of the three preceding system embodiments, wherein the processing device is further configured to execute at least one training of the preprocessing of the electronic representation of the at least one spectacle lens prescription document.

Clause 20: The processing device according to any one of the preceding system embodiments, wherein the processing device is configured to provide the data related to refractive values in a structured output file to the at least one output interface.

Clause 21: A system for processing at least one spectacle lens prescription document, the system comprising at least one input interface configured to receive an electronic representation of at least one spectacle lens prescription document;

a processing device according to one of the preceding embodiments; and at least one output interface configured to provide the data related to the refractive values.

Clause 22: The system according to the preceding embodiment, wherein the at least one input interface is configured to receive the electronic representation of the at least one spectacle lens prescription document in form of at least one of an image file or a portable document format.

Clause 23: A computer-implemented method for determining data related to refractive values from a spectacle lens prescription document, the method comprising a step of determining data related to refractive values from the at least one spectacle lens prescription document by determining at least one pattern comprising the data related to the refractive values from an electronic representation of the at least one spectacle lens prescription document; and determining text comprising the data related to the refractive values from the electronic representation of the at least one spectacle lens prescription document, wherein the data related to the refractive values are determined by identifying and using a surface distribution of the at least one pattern over the surface of the electronic representation of the at least one spectacle lens prescription document.

Clause 24: The method according to the preceding embodiment, wherein the text comprising the data related to the refractive values is determined from the at least one pattern.

Clause 25: The method according to any one of the preceding method embodiments, wherein the surface distribution of the at least one pattern comprising the data related to the refractive values is, firstly, identified from the electronic representation of the at least one spectacle lens prescription document, wherein the text comprising the data related to the refractive values is, subsequently, determined from the at last one pattern.

Clause 26: The method according to any one of the preceding method embodiments, wherein the text comprising the data related to the refractive values is, firstly, determined from the electronic representation of the at least one spectacle lens prescription document, wherein the surface distribution of the at least one pattern comprising the text is, subsequently, identified from the electronic representation of the at least one spectacle lens prescription document.

Clause 27: The method according to any one of the preceding method embodiments, further comprising the step of training the determining of the at least one pattern comprising the data related to the refractive values by providing a plurality of electronic representations of training spectacle lens prescription documents each comprising a known surface distribution of particular patterns over the electronic representation of a particular training spectacle lens prescription document;

determining a preliminary surface distribution of the particular patterns over the electronic representation of the particular training spectacle lens prescription document; and adjusting the preliminary surface distribution of the particular patterns to the known surface distribution of the particular patterns over the electronic representation of the particular training spectacle lens prescription document, wherein the training is repeated until a deviation between the preliminary surface distribution and the known surface distribution of the particular pattern is below a threshold.

Clause 28: The method according to any one of the preceding method embodiments, further comprising the step of training the determining of the text comprising the data related to the refractive values by providing a plurality of electronic representations of training spectacle lens prescription documents each comprising known text comprising the data related to the refractive values;

determining a preliminary text from the electronic representation of a particular spectacle lens prescription document; and adjusting the preliminary text as determined from the electronic representation of the particular spectacle lens prescription document to the known text, wherein the training is repeated until a deviation between the preliminary text and the known text is below a threshold.

Clause 29: The method according to any one of the preceding method embodiments, further comprising the step of validating a content of the data related to the refractive values.

Clause 30: The method according to the preceding embodiment, wherein the validating of the content of the data related to the refractive values comprises at least one of:

ascertaining whether a particular refractive value falls within a first predefined range;

ascertaining whether a particular refractive value is provided as a multitude of a predefined value;

ascertaining whether a further particular refractive value falls within a second predefined range in an event in which the particular refractive value falls within the first predefined range;

ascertaining whether a difference between two particular refractive values falls within a third predefined range;

ascertaining whether a particular piece of metadata corresponds to an expected form and content.

Clause 31: The method according to the preceding embodiment, wherein ascertaining whether a particular refractive value for each spectacle lens falls within a first predefined range comprises at least one of ascertaining whether a first value related to a sphere is $>-12$ dpt and $<+12$ dpt;

ascertaining whether a second value related to a cylinder is $>-12$ dpt and $<+12$ dpt;

ascertaining whether a third value related to a cylinder axis is $>0°$ and $<180°$;

ascertaining whether a fourth value related to a prism is $\geq 0$ dpt and $<+10$ dpt;

ascertaining whether a fifth value related to a prism base is >0° and <180°.

Clause 32: The method according to any one of the two preceding embodiments, wherein ascertaining whether a particular refractive value is provided as a multitude of a predefined value comprises at least one of ascertaining whether the first value related to the sphere is provided as a multitude of 0.25 dpt;

ascertaining whether the second value related to the cylinder is provided as a multitude of 0.25 dpt;

ascertaining whether the fourth value related to the prism is provided as a multitude of 0.25 dpt.

Clause 33: The method according to any one of the three preceding embodiments, wherein ascertaining whether a difference between two particular refractive values falls within a third predefined range comprises at least one of ascertaining whether a difference between the first value related to the sphere for the left eye and the first value related to the sphere for the right eye is <2 dpt;

ascertaining whether a difference between the second value related to the cylinder for the left eye and the second value related to the cylinder for the right eye is <2 dpt.

Clause 34: The method according to any one of the four preceding embodiments, wherein ascertaining whether a particular piece of metadata corresponds to an expected form and content comprises at least one of ascertaining whether a period of time which has passed since an issuance date of the refractive values falls within a predefined reliability range;

ascertaining whether an expiration date of the refractive values has been passed;

ascertaining whether at least one piece of imprint information about an issuer of the refractive values refers to an existing optician; or ascertaining whether a signature of an issuer of the refractive values is valid.

Clause 35: The method according to any one of the six preceding embodiments, further comprising the step of training the validating a content of the data related to the refractive values by providing a plurality of electronic representations of training spectacle lens prescription documents each comprising known data related to refractive values;

determining preliminary data related to refractive values from the electronic representation of a particular training spectacle lens prescription document; and adjusting the preliminary data related to refractive values to the known data related to refractive values, wherein the training is repeated until a deviation between the preliminary data related to refractive values and the known data related to refractive values is below a threshold.

Clause 36: The method according to any one of the preceding method embodiments, further comprising the step of preprocessing the electronic representation of the at least one spectacle lens prescription document.

Clause 37: The method according to the preceding embodiment, wherein the preprocessing of the electronic representation of the at least one spectacle lens prescription document comprises validating a quality of the electronic representation of the at least one spectacle lens prescription document.

Clause 38: The method according to any one of the two preceding embodiments, wherein the preprocessing of the electronic representation of the at least one spectacle lens prescription document comprises classifying the at least one spectacle lens prescription document into one of at least two classes, wherein each class refers to a different type of spectacle lens prescription document.

Clause 39: The method according to the preceding embodiment, wherein the type of spectacle lens prescription document is selected from a machine written spectacle lens prescription document in table format;

a machine written spectacle lens prescription document without the table format;

a machine written spectacle lens prescription document having at least one data field which comprises at least one piece of data in a handwritten manner; or a handwritten spectacle lens prescription document.

Clause 40: The method according to any one of the four preceding embodiments, further comprising the step of training the preprocessing of the electronic representation of the at least one spectacle lens prescription document by providing a plurality of electronic representations of training spectacle lens prescription documents each comprising known data related to refractive values;

determining preliminary data related to refractive values from the electronic representation of a particular training spectacle lens prescription document; and adjusting the preliminary data related to refractive values to the known data related to refractive values, wherein the training is repeated until a deviation between the preliminary data related to refractive values and the known data related to refractive values is below a threshold.

Clause 41: A computer-implemented method for processing at least one spectacle lens prescription document, comprising the following steps:

receiving an electronic representation of at least one spectacle lens prescription document comprising data related to refractive values;

determining the data related to the refractive values from the electronic representation of the spectacle lens prescription document according to any one of the preceding method embodiments;

providing the data related to the refractive values for further processing.

Clause 42: The method according to the preceding embodiment, wherein the electronic representation of the at least one spectacle lens prescription document is provided in form of at least one of an image file or a portable document format.

Clause 43: The method according to any one of the two preceding embodiments, wherein the data related to refractive values is provided in a structured output file.

Clause 44: A computer program comprising instructions which, when the program is executed by a computer, cause the computer to carry out the method according to any one of the preceding method embodiments.

Clause 45: A method for producing at least one spectacle lens, wherein the producing of the at least one spectacle lens comprises processing at least one lens blank by using data related to refractive values as determined by the method for determining data related to refractive values from a spectacle lens prescription document according to any one of the preceding method embodiments.

Further optional features and exemplary embodiments of the present disclosure are disclosed in more detail in the subsequent description. Therein, the respective optional features may be implemented in an isolated fashion as well as in any arbitrary feasible combination, as the skilled person will recognize. It is emphasized here that the scope of the disclosure is not restricted to the exemplary embodiments.

BRIEF DESCRIPTION OF THE DRAWINGS

The disclosure will now be described with reference to the drawings wherein.

DESCRIPTION OF EXEMPLARY EMBODIMENTS

Figure 1:
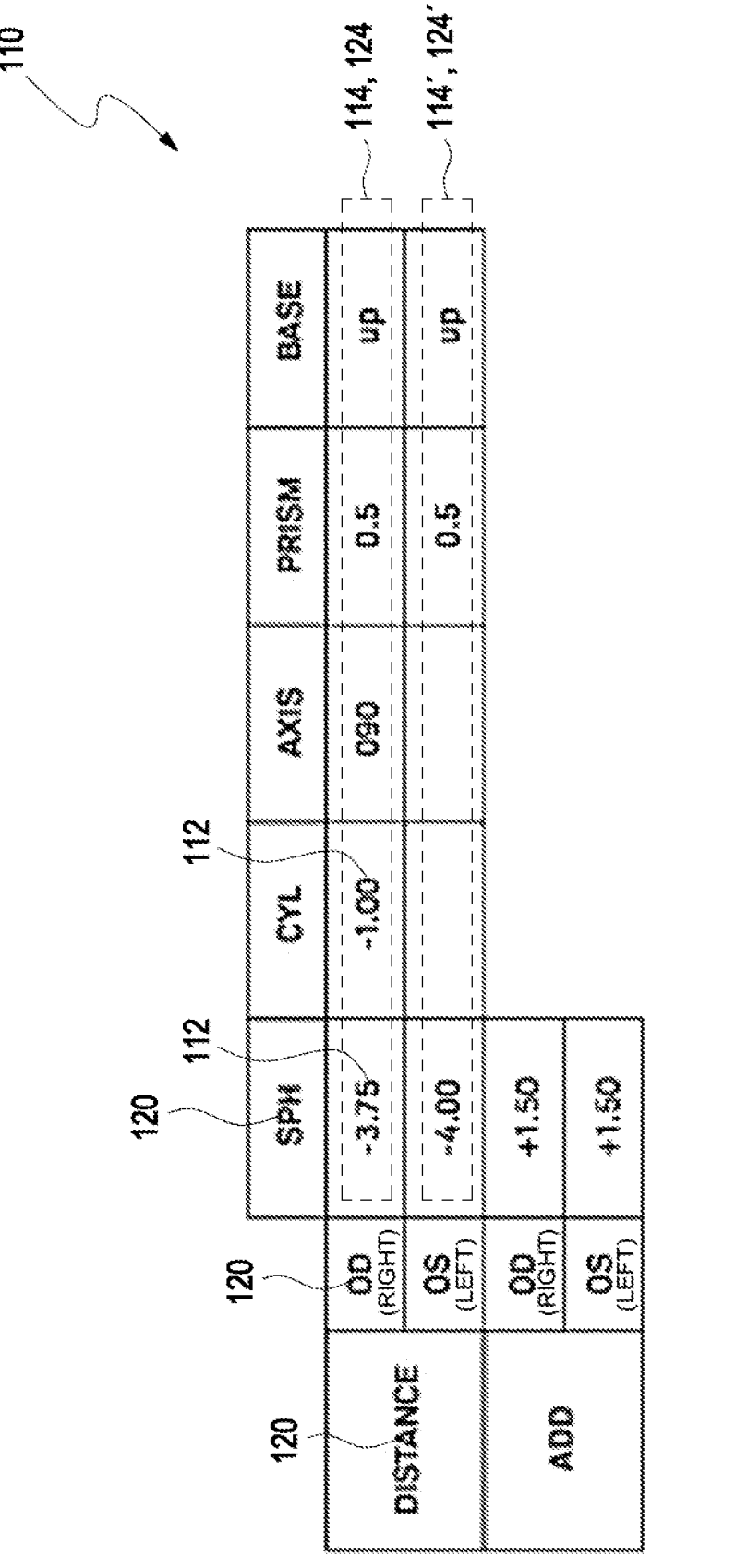
FIGS. 1A to 1N illustrate a plurality of examples of non-standard spectacle lens prescription documents as used for the present disclosure.
Figure 1:
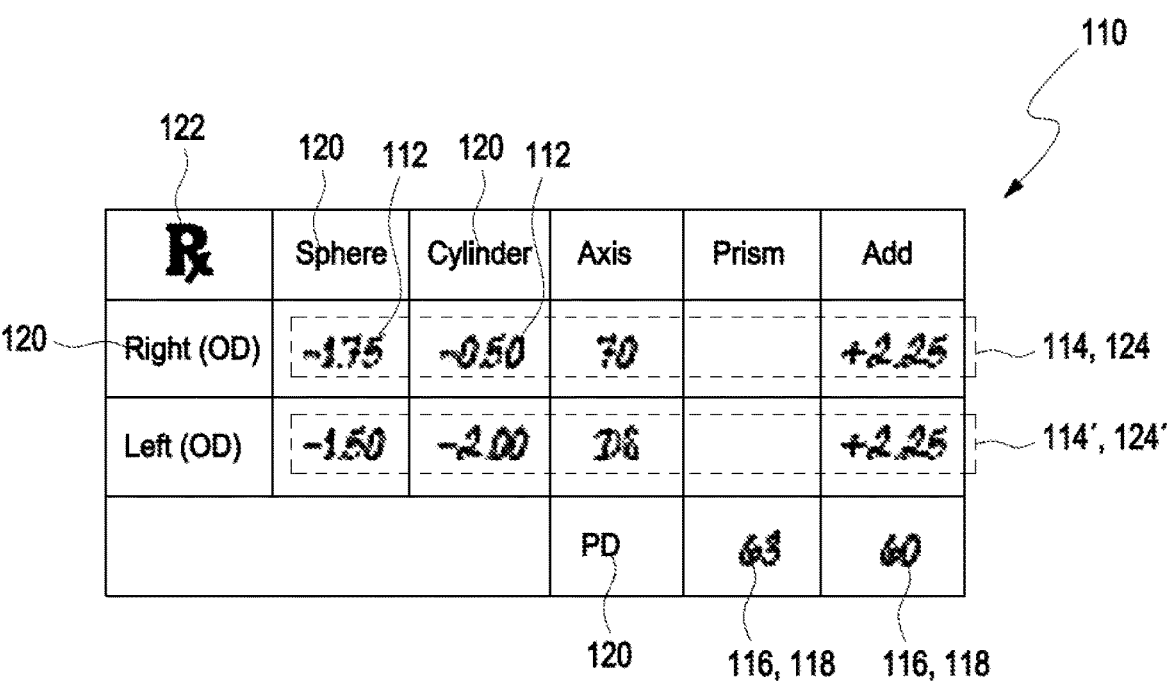
Figure 1:
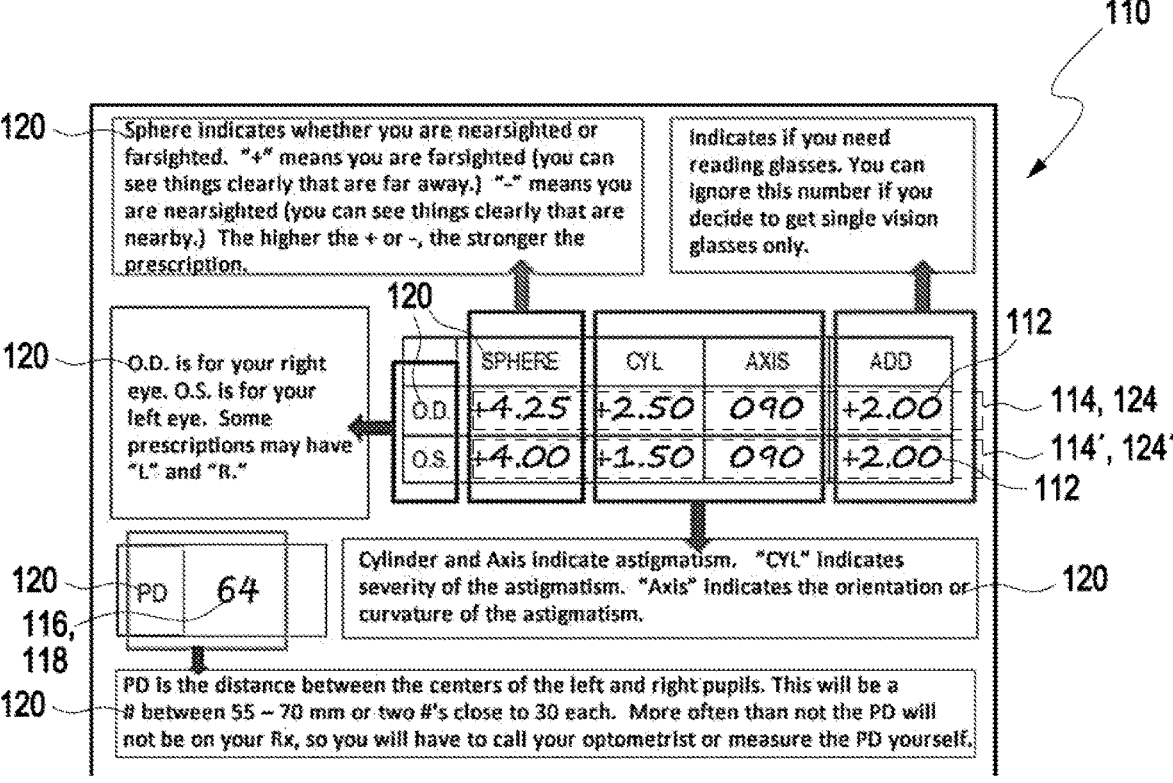

FIGS. 1A to 1N illustrate a plurality of examples of typical non-standard spectacle lens prescription documents 110 as used for the purposes of the present disclosure. As defined above, the spectacle lens prescription document 110 is a document which comprises data related to refractive values 112 which are, usually, comprised by at least on page or a portion thereof, wherein a single page is usually preferred. As indicated above, eye care professionals, such as opticians, typically, use non-standard spectacle lens prescription documents 110 for recording the data related to the refractive values 112, which can, subsequently, be used for further processing, in particular, for producing spectacle lenses in a manufacturing unit. All exemplary spectacle lens prescription documents 110 as presented in FIGS. 1A to 1N, use English language, however, for analyzing purposes as indicated above further exemplary spectacle lens prescription documents which are available in other languages (not depicted here), in particular a European language selected from French, Italian, German, or Spanish, or an Asian language selected from Mandarin, Japanese, and Korean, have also been used.

As illustrated in FIGS. 1A to 1N, each exemplary spectacle lens prescription document 110 as used herein comprises a plurality of patterns 114, 114', . . . which are distributed over a surface of the at least one page or the portion thereof. Herein, each pattern 114, 114', . . . comprises a particular structure that can be identified at a particular location on the at least one page or the portion thereof, wherein the particular structure may comprise at least one of text which comprises the data related to the refractive values 112 to be used for the purposes of the present disclosure;

text which comprises anything else, such as at least one of a further kind of value 116, e.g., a pupillary distance 118, or an explanation 120, typically in form of an abbreviation, to the type of value; or anything else 122, such as a logo of the eye care professional or a manufacturer of spectacle lenses.

As further illustrated in FIGS. 1A to 1N, the text 116 comprising the data related to the refractive values 112 as comprised by each pattern 114, 114', . . . , typically, comprises at least one of:

at least one sequence 124, 124', . . . of the refractive values 112; or at least one piece of metadata 126, specifically selected from at least one of an issuance date 128 or an expiration date 130 of the refractive values 112;

imprint information 132 about or a signature 134 of an issuer of the refractive values 112; or a name 136, an address 138, or an age 140 of a customer of whom the indicated refractive values 112 have been determined.

As further illustrated in FIGS. 1A to 1N, each pattern 114, 114', . . . which comprises the at least one sequence 124, 124', . . . of the refractive values 112 comprises the refractive values 112 in an order of a first value related to a sphere, usually abbreviated to "sphere" or "sph," followed by a second value related to a cylindrical power, usually abbreviated to "cylinder" or "cyl," followed by a third value related to a cylinder axis, usually abbreviated to "cyl axis" or "axis". In some exemplary embodiments, specifically in FIGS. 1A, 1B, 1G, 1K, and 1L, the pattern 114, 114', . . . may, in addition, comprise at least one further kind of refractive value 112, in particular a fourth value related to a prismatic effect, usually abbreviated to "prism," and a fifth value related to a prism base, usually abbreviated to "base," or a sixth value related to an addition, usually abbreviated to "add," wherein the third value may, typically, be followed by the fourth value which may be followed by the fifth value, or wherein the third value may, directly, be followed by the sixth value.

Figure 1D:
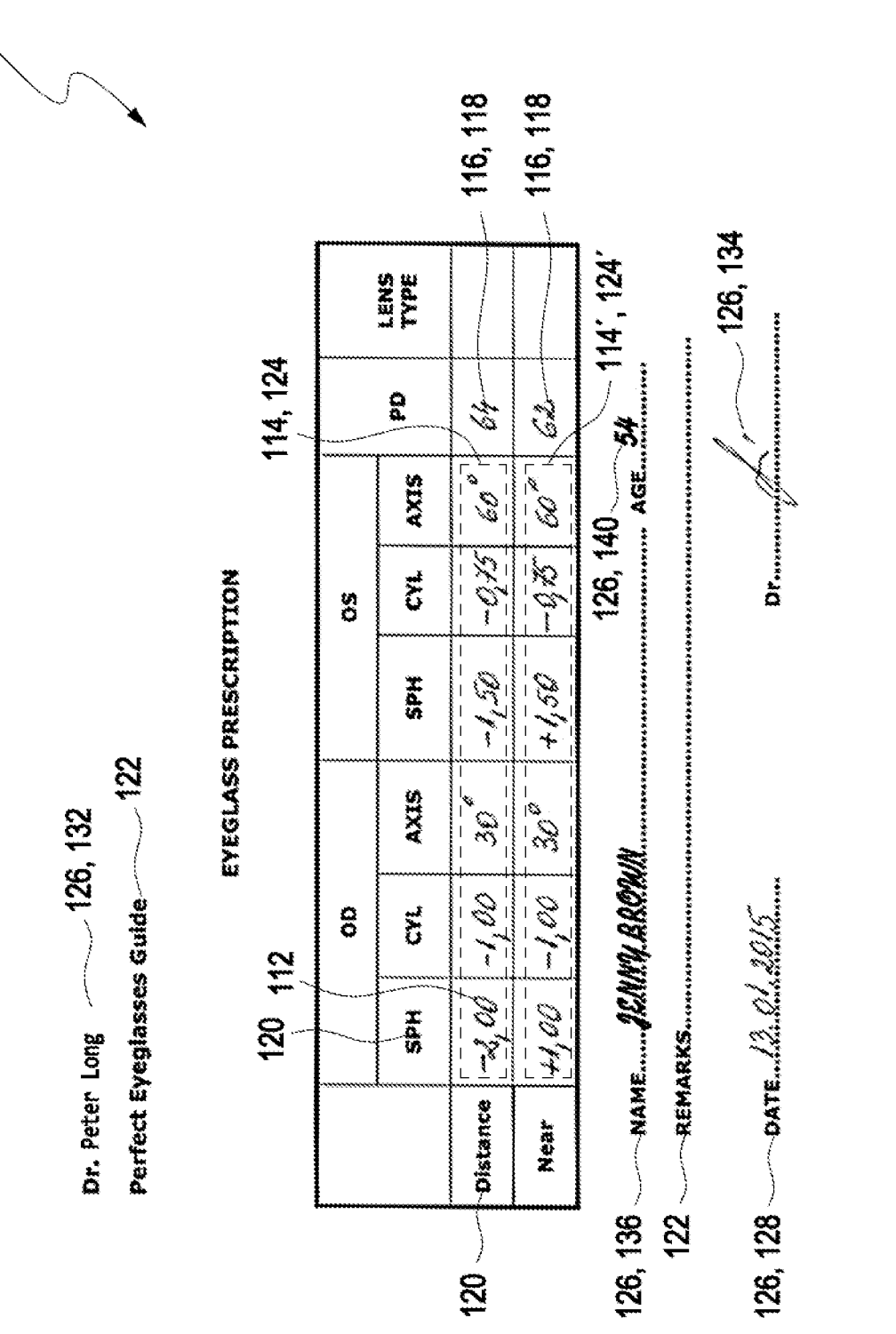
Figure 1E:
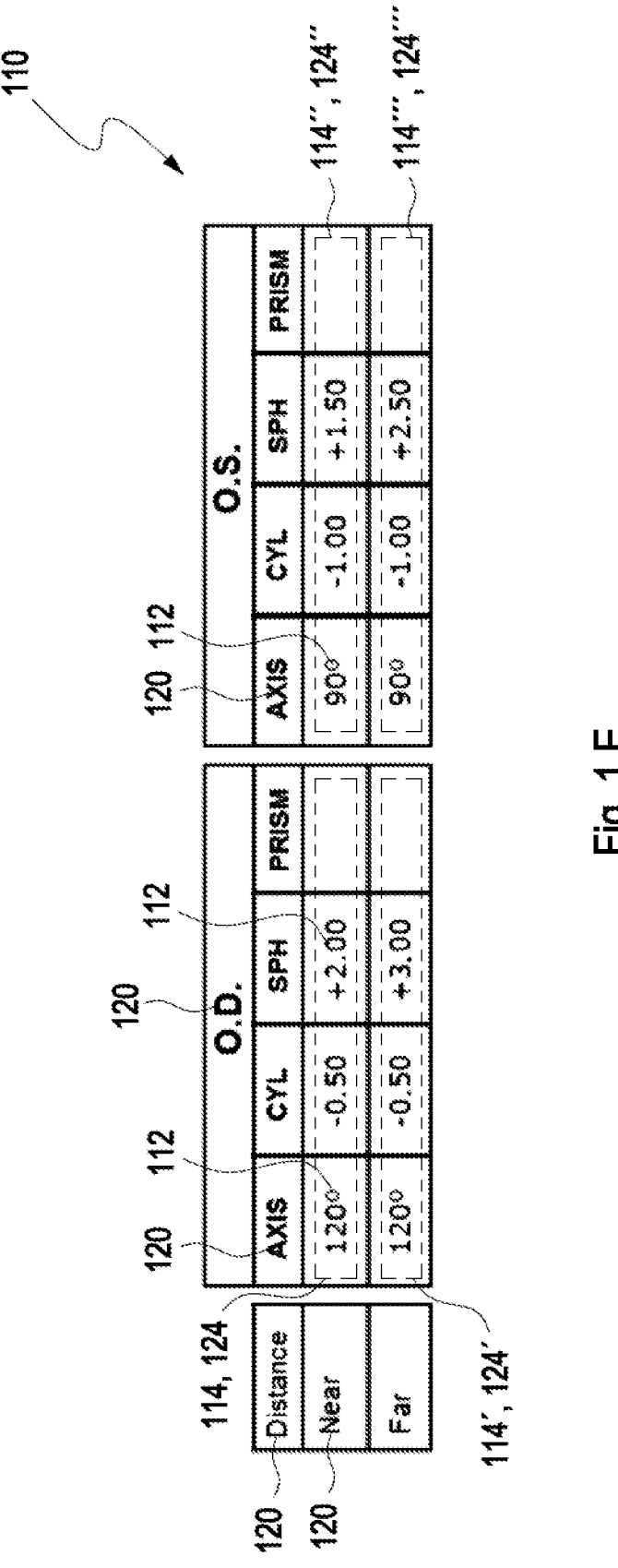
Figure 1:
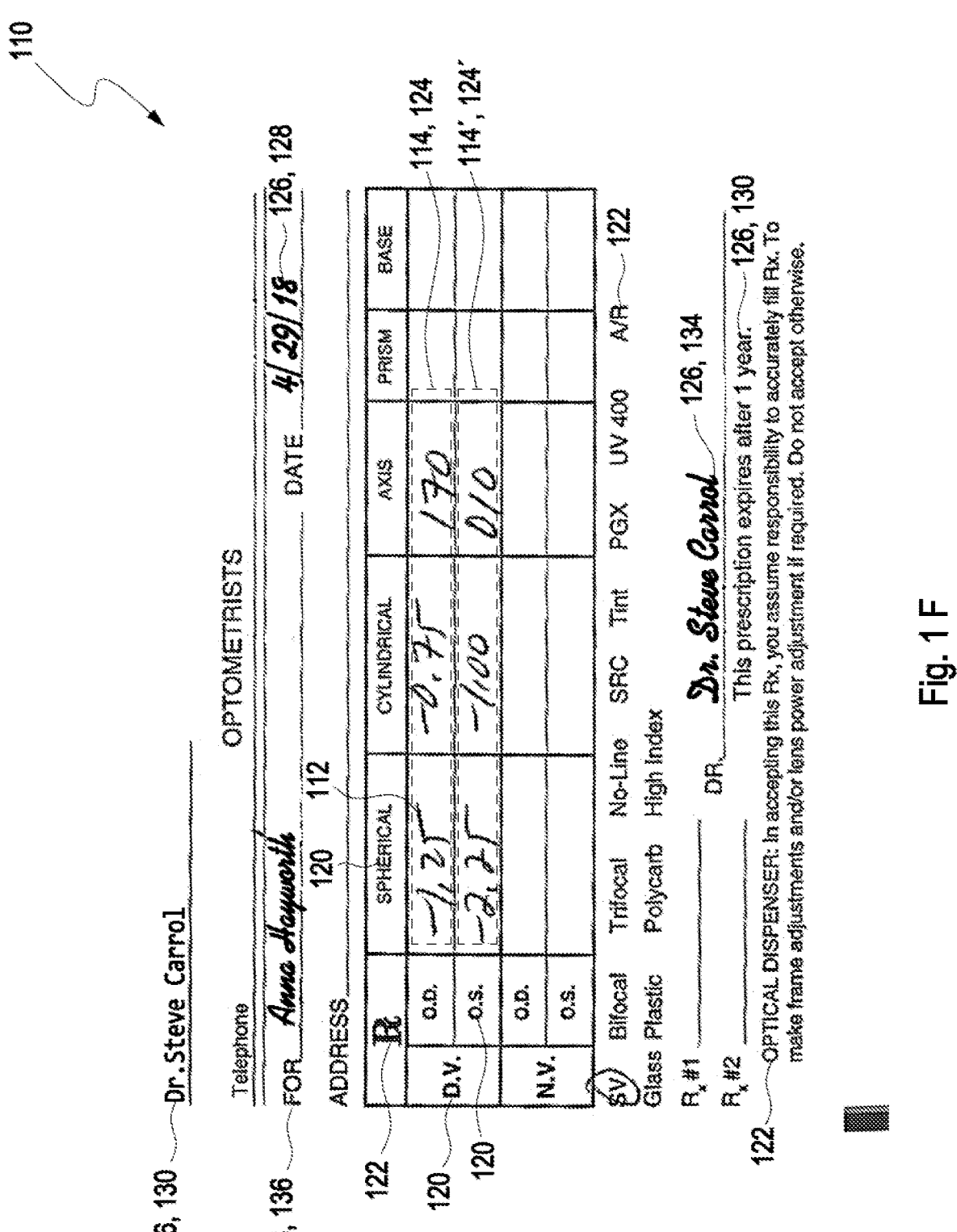
Figure 1:
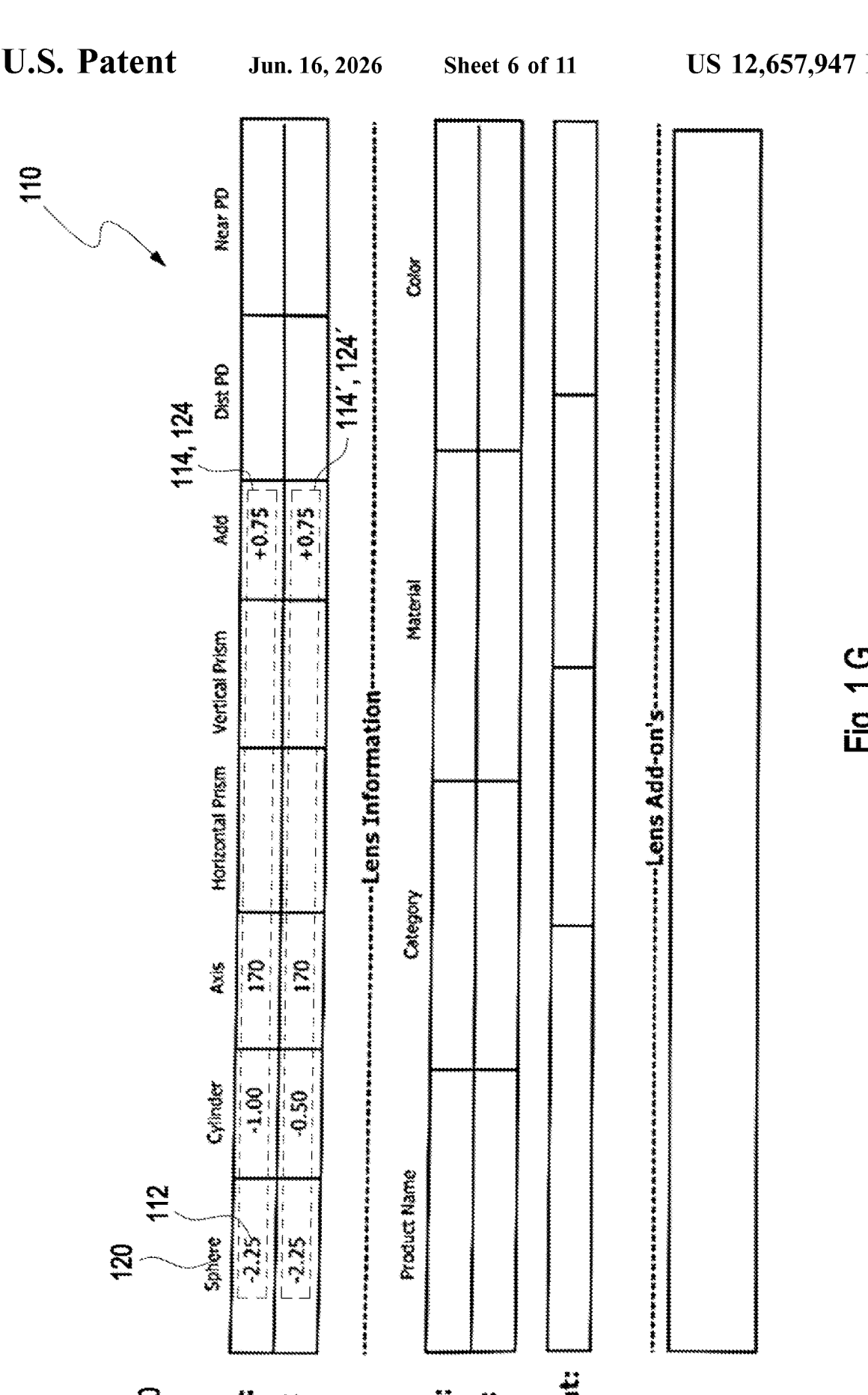
Figure 1:
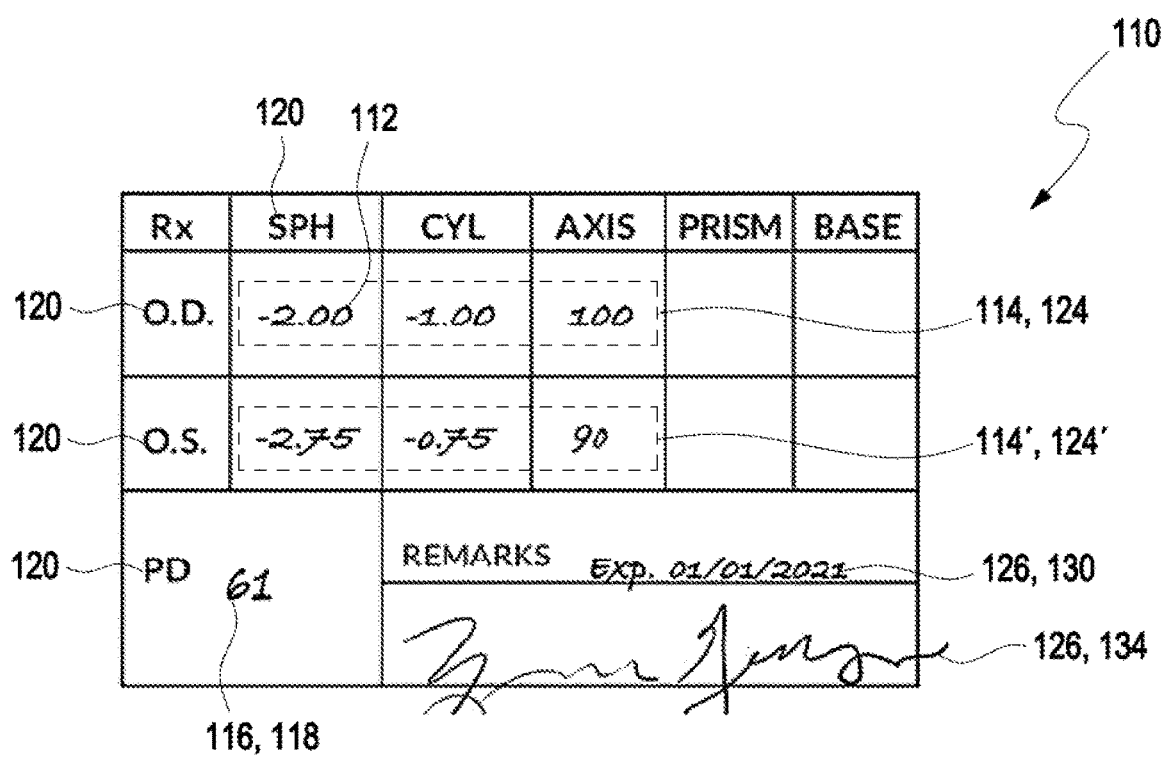
Figure 1:
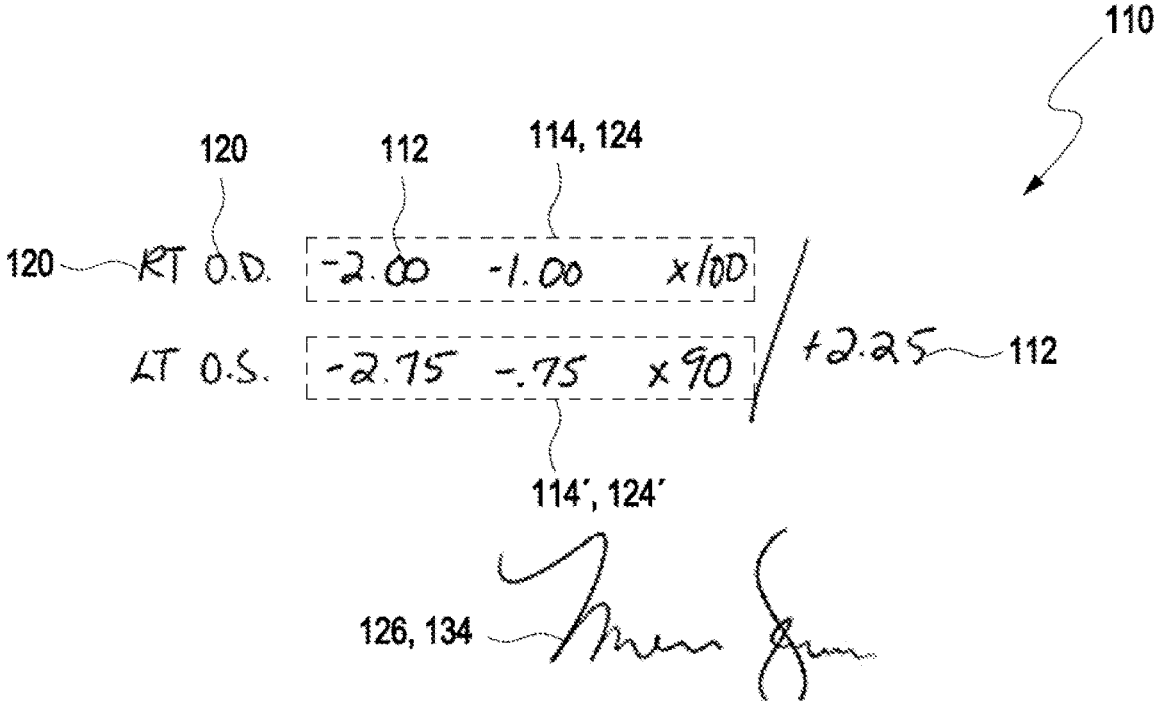
Figure 1J:
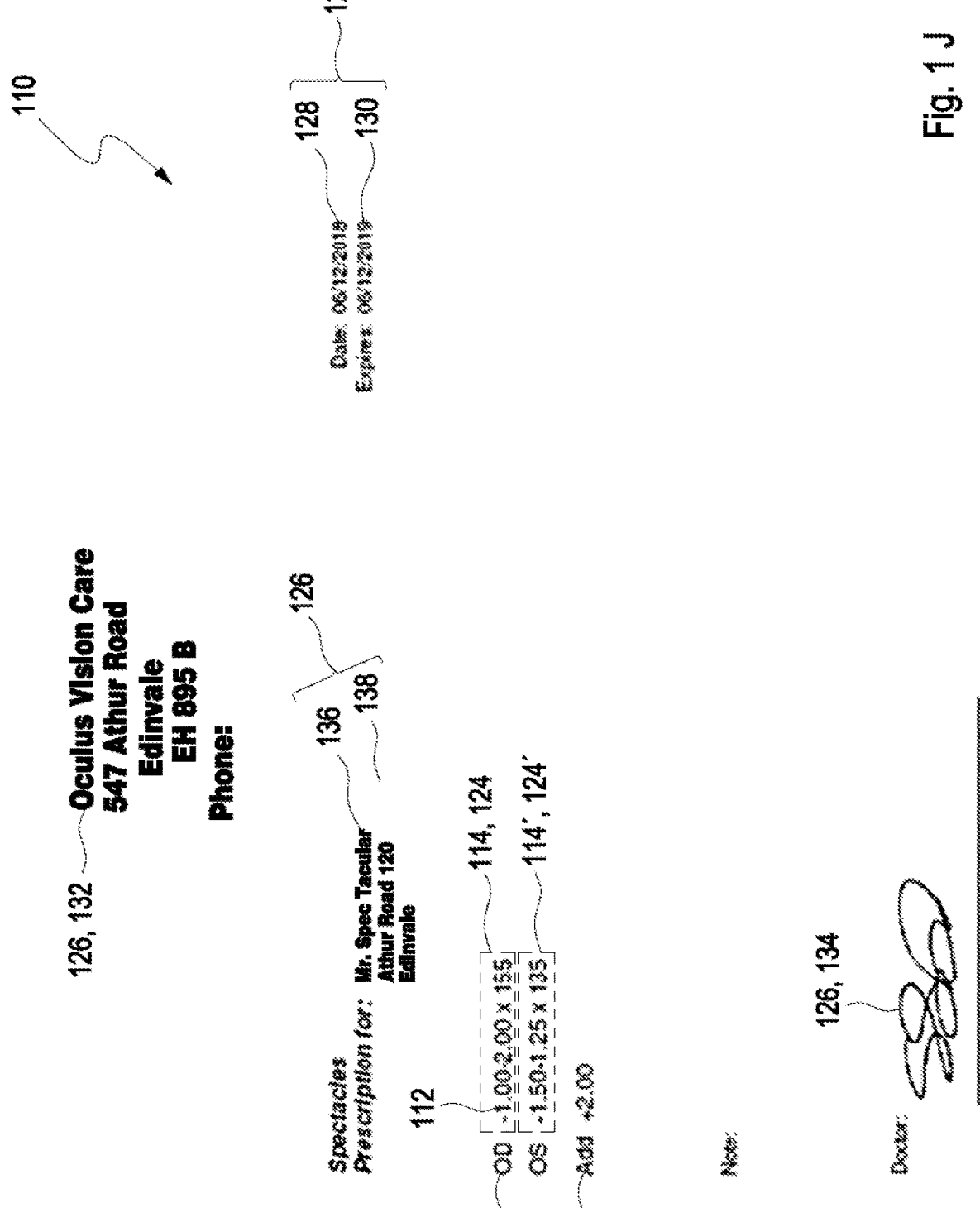
Figure 1:
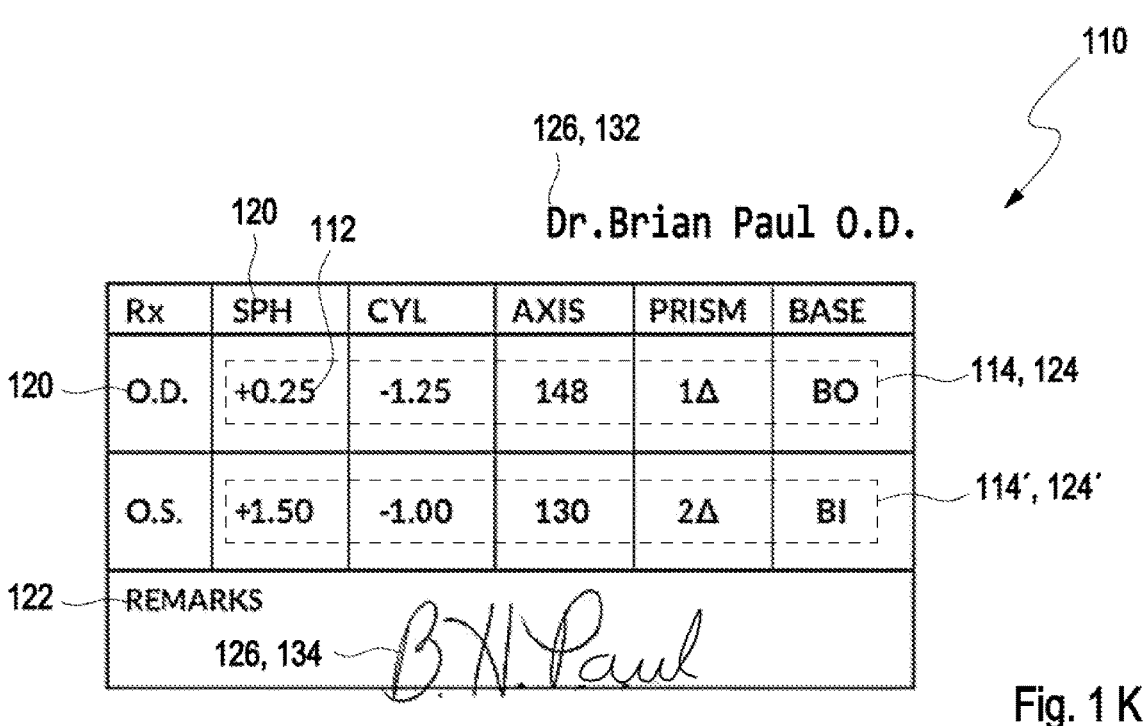
Figure 1:
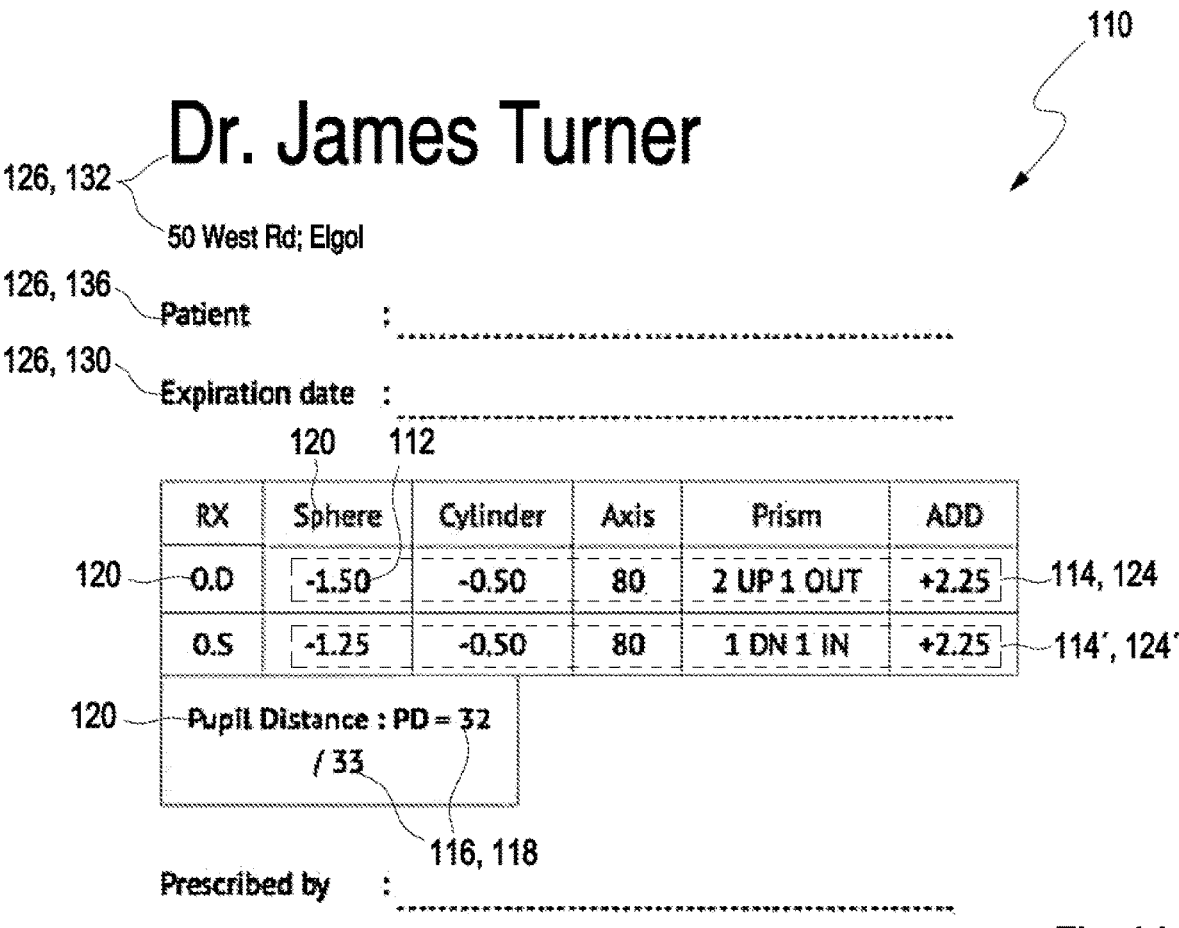
Figure 1:
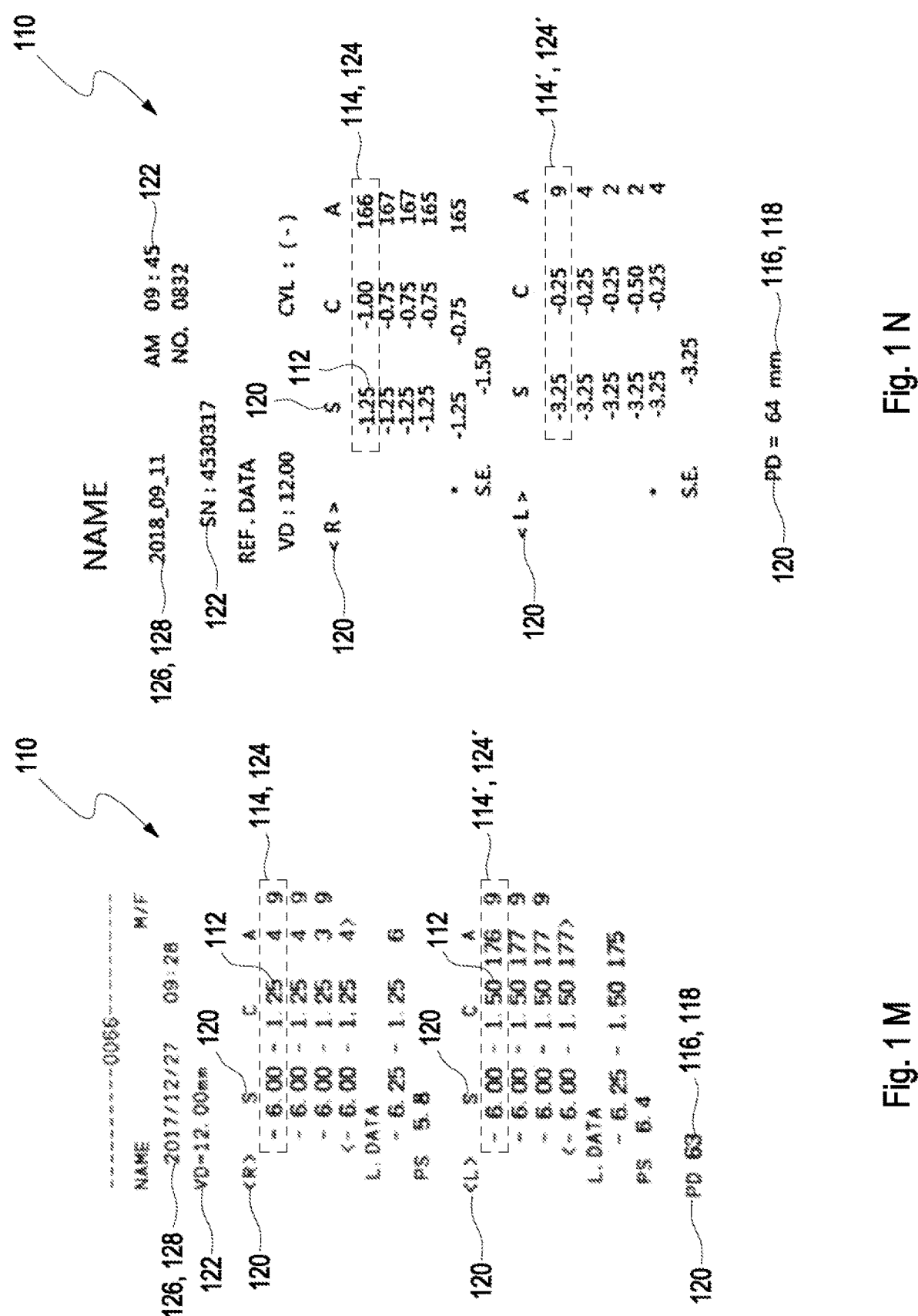

As illustrated in FIGS. 1A to 1C and 1F to 1N, the refractive values 112 in each sequence 124, 124', . . . are arranged in a horizontal fashion on the at least one the at least one page or the portion thereof comprising the spectacle lens prescription document 110. In this embodiment as depicted here, in which the first pattern 114 is arranged above the second pattern 114', a first set of refractive values 112 assigned to the right eye to be used for the right spectacle lens as denoted by at least one of the terms "Right," "OD," "RT" or "<R>" is, especially when the spectacle lens prescription document 110 is provided in a European language, arranged above the second set of refractive values assigned to the left eye to be used for the left spectacle lens as denoted by at least one of the terms "Left," "OS," "LT" or "<L>". However, as illustrated in FIGS. 1D and 1E, a different arrangement may also be feasible.

In an alternative embodiment (not depicted here) which is especially applicable when the spectacle lens prescription document 110 is provided in an Asian language, the refractive values 112 in each sequence 124, 124', . . . are arranged in a vertical fashion on the at least one the at least one page or the portion thereof comprising the spectacle lens prescription document 110. In this alternative embodiment, in which the first pattern 114 is arranged left of the second pattern 114', the first set of refractive values 112 assigned to the right eye to be used for the right spectacle lens is, typically, arranged left to the second set of refractive values assigned to the left eye to be used for the left spectacle lens.

Figure 2:
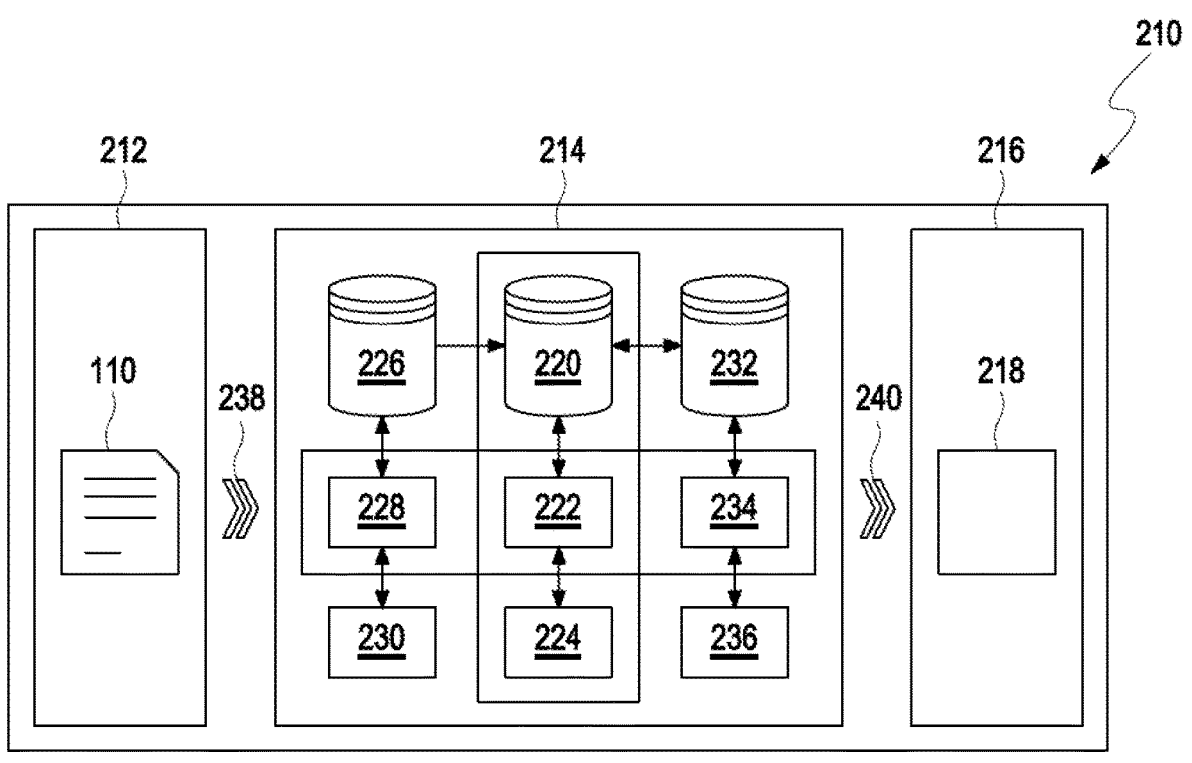
FIG. 2 illustrates an exemplary embodiment of a system for processing the spectacle lens prescription document according to the present disclosure.

FIG. 2 illustrates an exemplary embodiment of a system 210 for processing the spectacle lens prescription document 110 according to the present disclosure. As schematically depicted there, the system 210 comprises at least an input interface 212 configured to receive an electronic representation of the at least one spectacle lens prescription document 110, a processing device 214 configured to determine the data related to refractive values 112 from the electronic representation of the at least one spectacle lens prescription document 110, and an output interface 216 configured to provide the data related to the refractive values 112 to a recipient (not depicted here).

As described above, the input interface 212 can, typically, be configured to receive the electronic representation of the spectacle lens prescription document 110, in particular of one of the exemplary spectacle lens prescription documents 110 as illustrated in FIGS. 1A to 1N, typically in form of an image file or a portable document format. As further described above, the processing device 214 can, typically, be configured to provide the data related to refractive values 112 in form of a structured output file 218 to the output interface 216. For further details with respect to the input interface 212 and/or to the output interface 216, reference can be made to the description above.

In accordance with the present disclosure, the processing device 214 comprises a processing unit 220 which is configured to determine the plurality of patterns 114, 114', . . . which comprise the data related to the refractive values 112 from the electronic representation of the spectacle lens prescription document 110; and determine text comprising the data related to the refractive values 112 from the electronic representation of the spectacle lens prescription document 110 in a fashion that the data related to the refractive values 112 are determined by identifying and using a surface distribution of the plurality of patterns 114, 114', . . . which comprise the data related to the refractive values 112 over the electronic representation of the spectacle lens prescription document 110.

By way of example, the surface distribution of the plurality of patterns 114, 114', . . . which comprise the data related to the refractive values 112 can, firstly, be identified from the electronic representation of the spectacle lens prescription document 110, wherein the text which comprises the data related to the refractive values 112 can, subsequently, be determined from the plurality of patterns 114, 114', . . . . Alternatively or in addition, the text which comprises the data related to the refractive values 112 can, firstly, be determined from the electronic representation of the spectacle lens prescription document 110, wherein the surface distribution of the plurality of patterns 114, 114', . . . which comprises the text can, subsequently, be identified from the electronic representation of the spectacle lens prescription document 110.

For a purpose of operating the processing unit 220, an evaluating algorithm 222 can be applied which may be configured to determine the data related to refractive values 112 by evaluating the electronic representation of the spectacle lens prescription document 110 according to a predefined scheme, in particular by applying one or more algorithms configured for pattern recognition, text recognition, typo correction, handwritten text recognition, or grouping handwritten word segments, specifically as described above in more detail.

However, artificial intelligence, in particular a machine learning algorithm 224 can, advantageously, be applied. Herein, the machine learning algorithm 224 may be configured to execute a training of the determining of the plurality of the patterns 114, 114', . . . which comprise the data related to the refractive values 112 from the electronic representation of the spectacle lens prescription document 110; and/or the determining of the text comprising the data related to the refractive values 112 from the electronic representation of the spectacle lens prescription document 110.

For further detail with respect to the machine learning algorithm 224 reference can be made to the description above.

In an exemplary embodiment, the processing device 214 may comprise a preprocessing unit 226. In particular, the preprocessing unit 226 may be configured to preprocess the electronic representation of the spectacle lens prescription document 110 by validating a quality of the electronic representation of the spectacle lens prescription document 110 as received from the input interface 212. Alternatively or in addition, the preprocessing unit 226 may be configured to preprocess the electronic representation of the spectacle lens prescription document 110 by classifying the spectacle lens prescription document 110 into one of two or more classes, wherein each class refers to a different type of spectacle lens prescription document, specifically a a machine written spectacle lens prescription document in table format;

a machine written spectacle lens prescription document without the table format;

a machine written spectacle lens prescription document having at least one data field which comprises at least one piece of data in a handwritten manner; or a handwritten spectacle lens prescription document.

For this purpose, a preprocessing algorithm 228 which may be configured for such a purpose can be applied. Moreover, the preprocessing unit 226 may comprise a further machine learning algorithm 230 which may be configured to execute the training of the electronic representation of the preprocessing of the spectacle lens prescription document 110, specifically in a fashion as described above in more detail.

In a typical exemplary embodiment, the processing device 214 may, further, comprise a data content validating unit 232. In particular, the data content validating unit 232 may be configured to validate a content of the data related to the refractive values 112, specifically for providing an answer whether the data as identified in the electronic representation of the spectacle lens prescription document 110 by the processing unit 220 may actually be a valid value or not, such that only data comprising a valid value are considered as admissible for a further processing of the identified data.

As described above in more detail, one or more data content validating algorithms 234 may be used for the validating of the content of the data related to the refractive values 112 may, in particular, by:

ascertaining whether the identified refractive value 112 falls within a first predefined range;

ascertaining whether the identified refractive value 112 is provided as a multitude of a predefined value, such as of 0.25 dpt;

ascertaining whether a further identified refractive value 112 falls within a second predefined range in an event in which the identified refractive value 112 falls within the first predefined range;

ascertaining whether a difference between two the identified refractive values 112 falls within a third predefined range; and/or ascertaining whether a particular piece of metadata 126, such as the pieces of metadata 126 as identified from the electronic representation of the exemplary spectacle lens prescription document 110 as illustrated in FIG. corresponds to an expected form and content.

Moreover, the data content validating unit 232 may comprise a still further machine learning algorithm 236 which may be configured to execute the training of the validating of the content of the data related to the refractive values 112, specifically in a fashion as described above in more detail.

In addition, a first communication interface 238 may provide communication between the input interface 212 and the processing device 214, while a second communication interface 240 provide communication between the processing device 214 and the output interface 216. As schematically illustrated in FIG. 2, each the communication interface 238, 240 may be or comprise a unidirectional interface which may be configured to forward the at least one piece of data into the indicated single direction in least one of a wire-bound element or a wireless fashion, typically via encrypted data transfer. However, a further kind of communication interface may also be feasible.

Figure 3:
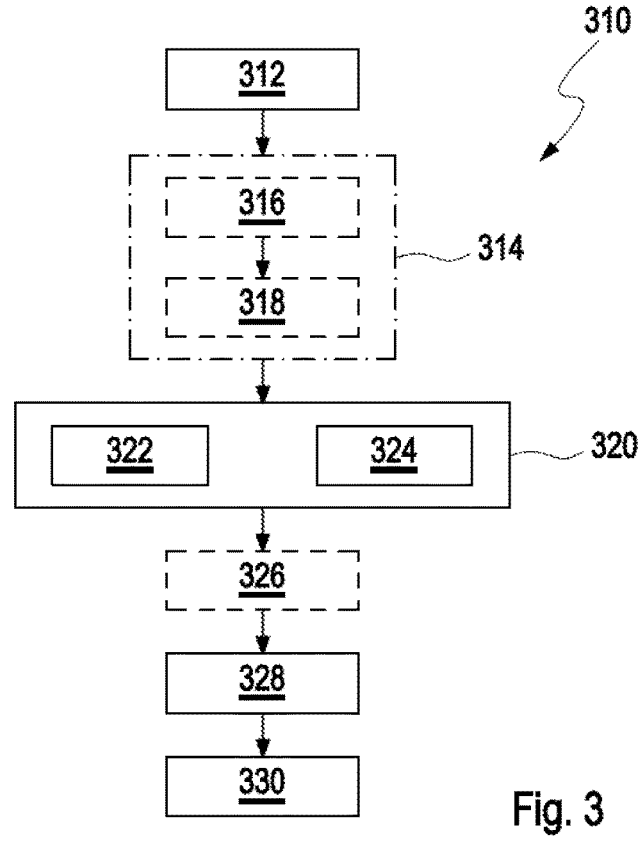
FIG. 3 illustrates an exemplary embodiment of a method for processing at least one spectacle lens prescription document according to the present disclosure.

FIG. 3 illustrates an exemplary embodiment of a computer-implemented method 310 for processing the spectacle lens prescription document 110 according to the present disclosure.

In a receiving step 312, an electronic representation of the spectacle lens prescription document 110 which comprises the data related to refractive values 112 is received, in particular in a fashion as described above in more detail.

In an optional preprocessing step 314, one or more preprocessing procedures may be applied to the electronic representation of the spectacle lens prescription document 110. In particular, in a quality validating step 316, a quality of the electronic representation of the spectacle lens prescription document 110 may be validated, specifically in a fashion as described above. Alternatively or in addition, in a classifying step 318, the spectacle lens prescription document 110 may be classified into one of two or more classes, specifically into a class as described above in more detail.

In a determining step 320, the data related to the refractive values 112 is determined from the electronic representation of the spectacle lens prescription document 110 by applying the following steps:

in a pattern determining step 322, the plurality of the patterns 114, 114', . . . which comprise the data related to the refractive values 112 is determined from the electronic representation of the spectacle lens prescription document 110; and in a text determining step 324, the text comprising the data related to the refractive values 112 is determined from the electronic representation of the spectacle lens prescription document 110.

Herein, the data related to the refractive values 112 are determined by identifying and using a surface distribution of the plurality of the patterns 114, 114', . . . over the electronic representation of the spectacle lens prescription document 110.

As described above, the pattern determining step 322 may be performed before the text determining step 324. In this fashion, the surface distribution of the plurality of the patterns 114, 114', . . . which comprises the data related to the refractive values 112 can, firstly, be identified from the electronic representation of the spectacle lens prescription document 110, wherein the text which comprises the data related to the refractive values 112 can, subsequently, be determined from the plurality of the patterns 114, 114', . . .

Alternatively or in addition, the text determining step 324 may be performed before the pattern determining step 322. In this fashion, the text which comprises the data related to the refractive values 112 can, firstly, be determined from the electronic representation of the spectacle lens prescription document 110, wherein the surface distribution of the plurality of the patterns 114, 114', . . . which comprises the text can, subsequently, be identified from the electronic representation of the spectacle lens prescription document 110.

In an optional, particularly preferred data content validating step 326, the content of the data related to the refractive values 112 may be validated, specifically for providing an answer whether the data as identified in the electronic representation of the spectacle lens prescription document 110 may actually be a valid value or not, such that only data comprising a valid value are considered as admissible for a further processing of the identified data.

In a first example, the data content validating unit 232 may perform the following data content validating process:

providing the refractive values 112 as determined for a left eye:

sphere: −9.75 dpt; cylinder: +2.25 dpt, axis: 60°;

ascertaining whether a value for the sphere is between −10 and 6 inclusive;

ascertaining whether the value for the sphere is provided as a multitude of 0.25 dpt;

ascertaining whether, for the value of the sphere of −9.75, the value for the cylinder is between −0.25 and +2 inclusive;

ascertaining whether the value for the cylinder is provided as a multitude of 0.25 dpt; and ascertaining whether the value for the axis of 60° is between 0 and 180°.

As a result, an invalid value is determined in this first example since the value for the cylinder is +2.25 dpt which does not meet the condition of being between −0.25 and +2 inclusive. As mentioned above, this invalid value is not considered as admissible for the further processing of the identified data.

In a second example, the data content validating unit 232 may perform the following data content validating process:

providing the refractive values 112 as determined for a left eye:

sphere: −9.75 dpt; cylinder: +2.25 dpt, axis: 60°;

ascertaining whether a value for the sphere is between −10 and 6 inclusive;

ascertaining whether the value for the sphere is provided as a multitude of 0.25 dpt;

ascertaining whether, for the value of the sphere of −9.75, the value for the cylinder is between −0.25 and +2 inclusive;

ascertaining whether the value for the cylinder is provided as a multitude of 0.25 dpt; and ascertaining whether the value for the axis of 100° is between 0 and 180°.

As a result, a valid value is determined in this second example since all values for the sphere, the cylinder, and the axis meet the indications conditions. As mentioned above, this valid value is considered as admissible for the further processing of the identified data.

In a third example, the data content validating unit 232 may perform a further data content validating process in which it may be ascertained whether the spectacle lens prescription document 110 may be valid with respect to the issuance date 128 and/or the expiration date 130 of the refractive values 112 or not. For this purpose, the expiration date 130 as directly recognized on the spectacle lens prescription document 110 may be used. Alternatively or in addition, the issuance date 128 may be used, in which case a predefined calculation rule may, further, be employed, wherein the predefined calculation rule may comprise a period of time, such as 6 months, 1 year, 2 years, or 5 years, that may, specifically, depend on a country of issuance of the spectacle lens prescription document 110. Herein, the piece of metadata 126, in particular a determination of the expiration date 130 from the issuance date 128, can depend on a specific regulatory framework, which may be applicable for at least one particular country. However, further examples are feasible.

In a fourth example, the data content validating unit 232 may comprise validating whether a signature 134 may be present on the electronic representation of the spectacle lens prescription document 110 or not.

In a fifth example, the data content validating unit 232 may comprise validating whether the at least one piece of imprint information 132 about an issuer of the refractive values 112 may refer to an existing optician or not. The at least one piece of imprint information 132 may comprise at least one of a name, an address, a phone number, a fax number, or an email address of the corresponding issuer.

Further examples are feasible.

In a providing step 328, the data related to the refractive values 112 may be provided for further processing, specifically to one or more recipients 330 in a fashion as described above in more detail, specifically for the producing of one or more spectacle lenses, wherein the producing of the spectacle lenses comprises processing at least one lens blank by using the data related to the refractive values 112 as determined by the method 320 for determining the data related to refractive values 112 from the electronic representation of the spectacle lens prescription document.

In addition, the computer-implemented method 310 for processing the spectacle lens prescription document 110 according to the present disclosure as used herein may, further, comprise one or more training steps (not depicted here). Herein, the one or more training steps may be configured to execute at least one training of any one of the mentioned steps, in particular of the pattern determining step 322 and/or the text determining step 324 as well as of the optional quality validating step 316, of the optional classifying step 318 and/or of the optional data content validating step 326, specifically in manner fashion as described above in more detail.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 spectacle lens prescription document
112 refractive values
114, 114', . . . pattern
116 further kind of value
118 pupillary distance

120 explanation
122 anything else
124, 124', . . . sequence
126 metadata
128 issuance date
130 expiration date
132 imprint of issuer of the refractive values
134 signature of issuer of the refractive values
136 name of customer
138 address of customer
140 age of customer
210 system
212 input interface
214 processing device
216 output interface
218 structured output file
220 processing unit
222 evaluating algorithm
224 machine learning algorithm
226 preprocessing unit
228 preprocessing algorithm
230 machine learning algorithm
232 data content validating unit
234 data content validating algorithm
236 machine learning algorithm
238 first communication interface
240 second communication interface
310 method for processing a spectacle lens prescription document
312 receiving step
314 preprocessing step
316 quality validating step
318 classifying step
320 determining step
322 pattern determining step
324 text determining step
326 data content validating step
328 providing step
330 recipient

The invention claimed is:

1. A processing device for determining data related to refractive values from at least one spectacle lens prescription document, wherein the processing device is configured to:

determine at least one pattern containing data related to values from an electronic representation of at least one document; and determine text containing the data related to the values from the electronic representation of the at least one document, wherein the processing device is configured to determine the data related to the values by identifying and using a surface distribution of the at least one pattern containing the data related to the values over the electronic representation of the at least one document, wherein the surface distribution is a spatial arrangement of the at least one pattern on the surface of the at least one document with regard to a location of each pattern on at least a portion of the at least one document, wherein the values contain a first value and at least one second value and for the determination of the data at least one pattern recognition algorithm is used, wherein the values are refractive values and the document is a spectacle lens prescription document, and wherein the pattern recognition algorithm determines data related to the first value by performing an evaluation of a relative position of the first value in relation to the at least one second value.

2. The processing device according to claim 1, wherein the values are for the purpose of producing at least one spectacle lens.

3. The processing device according to claim 1, wherein the refractive values correspond to at least one refractive error of at least one eye of a person.

4. The processing device according to claim 1, wherein the at least one pattern is a particular structure on the surface of the at least one spectacle lens prescription document which is identified by the processing device at a particular location on at least one page or a portion of the at least one page of the at least one spectacle lens prescription document.

5. The processing device according to claim 1, wherein the data related to the refractive values contains a first sequence of refractive values assigned to a right spectacle lens and a second sequence of refractive values assigned to a left spectacle lens.

6. The processing device according to claim 5, wherein each sequence of the refractive values contains the first value related to a sphere, the second value related to a cylinder, and a third value related to an axis of the corresponding spectacle lens, and wherein each sequence of the refractive values includes the refractive values in an order of the first value related to the sphere followed by the second value related to the cylinder, followed by the third value related to the axis of the corresponding spectacle lens.

7. The processing device according to claim 5, wherein the processing device is configured to:

identify and use the surface distribution of at least one first pattern containing the first sequence of the refractive values assigned to the right spectacle lens and of at least one second pattern containing the second sequence of the refractive values assigned to the left spectacle lens over the electronic representation of the at least one spectacle lens prescription document.

8. The processing device according to claim 7, wherein the refractive values in each sequence are arranged:

in a horizontal fashion on the electronic representation of the at least one spectacle lens prescription document, wherein the first pattern containing the first sequence of the refractive values assigned to the right spectacle lens is arranged above the second pattern containing the second sequence of the refractive values assigned to the left spectacle lens; or in a vertical fashion on the electronic representation of the at least one spectacle lens prescription document, wherein the first pattern containing the first sequence of the refractive values assigned to the right spectacle lens is arranged left to the second pattern containing the second sequence of the refractive values assigned to the left spectacle lens.

9. The processing device according to claim 5, wherein each sequence of the refractive values contains a first set of refractive values assigned to far vision and a second set of refractive values assigned to near vision.

10. The processing device according to claim 1, wherein the data related to the refractive values further contains at least one piece of metadata, and wherein the at least one piece of metadata is selected from at least one of:

an issuance date of the refractive values;

an expiration date of the refractive values;

at least one piece of imprint information about an issuer of the refractive values; and a signature of an issuer of the refractive values.

11. The processing device according to claim 1, wherein the processing device is further configured to at least one of:

validate the electronic representation of the at least one spectacle lens prescription document based on its quality, wherein the quality refers to a readability of the electronic representation of the at least one spectacle lens prescription document;

classify the at least one spectacle lens prescription document into one of at least two classes, wherein each class refers to a different type of spectacle lens prescription document, wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document; and validate a content of the data related to the refractive values.

12. A system for processing at least one spectacle lens prescription document, the system comprising:

at least one input interface configured to receive an electronic representation of at least one spectacle lens prescription document;

a processing device according to claim 1; and at least one output interface configured to provide the data related to the refractive values to a recipient, wherein the processing device is configured to provide the at least one piece of data related to the refractive values in form of a structured output file to the at least one output interface, wherein the structured output file is a file in which the pieces of data follow a predefined arrangement in order to facilitate further processing of the output file by the recipient, and wherein the recipient is a data processing system operating a manufacturing unit for producing the at least one spectacle lens.

13. A computer-implemented method for determining data related to refractive values from a spectacle lens prescription document, the method comprising a step of:

determining data related to values from the at least one document by determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values contain a first value and at least one second value and for the determination of the data at least one pattern recognition algorithm is used, wherein the values are refractive values and the document is a spectacle lens prescription document, and wherein the pattern recognition algorithm determines data related to the first value by performing an evaluation of a relative position of the first value in relation to the at least one second value.

14. The method according to claim 13, the method further comprising a step of at least one of:

validating the electronic representation of the at least one spectacle lens prescription document based on its quality, wherein the quality refers to a readability of the electronic representation of the at least one spectacle lens prescription document;

classifying the at least one spectacle lens prescription document into one of at least two classes, wherein each class refers to a different type of spectacle lens prescription document, and wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document;

validating a content of the data related to the refractive values;

training the determining of the text containing the data related to the refractive values;

training the determining of the at least one pattern containing the data related to the refractive values;

training the validating of the quality of the electronic representation of the at least one spectacle lens prescription document;

training the classifying of the at least one spectacle lens prescription document into one of at least two classes, wherein each class refers to a different type of spectacle lens prescription document; and training the validating of the content of the data related to the refractive values.

15. The method according to claim 14, wherein the validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range;

ascertaining whether a difference between two particular refractive values falls within a third predefined range;

wherein the electronic representation of the at least one spectacle lens prescription document is provided in format of at least one of an image file or a portable document format, and wherein validating of the content of the data related to the refractive values contains ascertaining whether a particular piece of metadata corresponds to an expected format and content.

16. A computer-implemented method for processing at least one spectacle lens prescription document, comprising the following steps:

receiving an electronic representation of at least one spectacle lens prescription document containing data related to refractive values;

determining the data related to the refractive values from the spectacle lens prescription document according to claim 13; and providing the data related to the refractive values for further processing.

17. A computer-implemented method for processing at least one spectacle lens prescription document for a purpose of producing at least one spectacle lens, comprising the following steps:

receiving an electronic representation of at least one spectacle lens prescription document containing data related to refractive values;

determining the data related to the refractive values from the spectacle lens prescription document according to claim 13;

providing the data related to the refractive values for further processing.

18. A computer program stored on a non-transitory storage medium and comprising instructions which, when the program is executed by a computer, cause the computer to carry out a step of:

determining data related to values from the at least one document by determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values contain a first value and at least one second value and for the determination of the data at least one pattern recognition algorithm is used, wherein the values are refractive values and the document is a spectacle lens prescription document, and wherein the pattern recognition algorithm determines data related to the first value by performing an evaluation of a relative position of the first value in relation to the at least one second value.

19. A method for producing at least one spectacle lens, wherein the producing the at least one spectacle lens comprises processing at least one lens blank by using data related to refractive values as determined by carrying out a step of:

determining data related to values from at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values contain a first value and at least one second value and for the determination of the data at least one pattern recognition algorithm is used, wherein the values are refractive values and the document is a spectacle lens prescription document, and wherein the pattern recognition algorithm determines data related to the first value by performing an evaluation of a relative position of the first value in relation to the at least one second value.

20. A processing device for determining data related to refractive values from at least one spectacle lens prescription document, wherein the processing device is configured to:

determine at least one pattern containing the data related to the values from an electronic representation of at least one document; and determine text containing the data related to the values from the electronic representation of the at least one document, wherein the processing device is configured to determine the data related to the values by identifying and using a surface distribution of the at least one pattern containing the data related to the values over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the processing device is further configured to validate a content of the data related to the refractive values, and wherein the validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range.

21. The processing device according to claim 20, wherein the values are for the purpose of producing at least one spectacle lens.

22. The processing device according to claim 20, wherein the refractive values correspond to at least one refractive error of at least one eye of a person.

23. The processing device according to claim 20, wherein the at least one pattern is a particular structure on the surface of the at least one spectacle lens prescription document which is identified by the processing device at a particular location on at least one page or a portion of the at least one page of the at least one spectacle lens prescription document.

24. The processing device according to claim 20, wherein the data related to the refractive values contains a first sequence of refractive values assigned to a right spectacle lens and a second sequence of refractive values assigned to a left spectacle lens.

25. The processing device according to claim 24, wherein each sequence of the refractive values contains a first value related to a sphere, a second value related to a cylinder, and a third value related to an axis of the corresponding spectacle lens, and wherein each sequence of the refractive values contains the refractive values in an order of the first value related to the sphere followed by the second value related to the cylinder followed by the third value related to the axis of the corresponding spectacle lens.

26. The processing device according to claim 24, wherein the processing device is configured to identify and use the surface distribution of at least one first pattern containing the first sequence of the refractive values assigned to the right spectacle lens and of at least one second pattern containing the second sequence of the refractive values assigned to the left spectacle lens over the electronic representation of the at least one spectacle lens prescription document.

27. The processing device according to claim 26, wherein the refractive values in each sequence are arranged:

in a horizontal fashion on the electronic representation of the at least one spectacle lens prescription document, wherein the first pattern containing the first sequence of the refractive values assigned to the right spectacle lens is arranged above the second pattern containing the second sequence of the refractive values assigned to the left spectacle lens; or in a vertical fashion on the electronic representation of the at least one spectacle lens prescription document, wherein the first pattern containing the first sequence of the refractive values assigned to the right spectacle lens is arranged left to the second pattern containing the second sequence of the refractive values assigned to the left spectacle lens.

28. The processing device according to claim 24, wherein each sequence of the refractive values contains a first set of refractive values assigned to far vision and a second set of refractive values assigned to near vision.

29. The processing device according to claim 20, wherein the data related to the refractive values further contains at least one piece of metadata, and wherein the at least one piece of metadata is selected from at least one of:

an issuance date of the refractive values;

an expiration date of the refractive values;

at least one piece of imprint information about an issuer of the refractive values; and a signature of an issuer of the refractive values.

30. The processing device according to claim 20, wherein the processing device is further configured to at least one of:

validate the electronic representation of the at least one spectacle lens prescription document based on its quality, wherein the quality refers to a readability of the electronic representation of the at least one spectacle lens prescription document;

classify the at least one spectacle lens prescription document into one of at least two classes, wherein each class refers to a different type of spectacle lens prescription document, and wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document.

31. A system for processing at least one spectacle lens prescription document, the system comprising:

at least one input interface configured to receive an electronic representation of at least one spectacle lens prescription document;

a processing device according to claim 20; and at least one output interface configured to provide the data related to the refractive values to a recipient, wherein the processing device is configured to provide the at least one piece of data related to the refractive values in form of a structured output file to the at least one output interface, wherein the structured output file is a file in which the pieces of data follow a predefined arrangement in order to facilitate further processing of the output file by the recipient, and wherein the recipient is a data processing system operating a manufacturing unit for producing the at least one spectacle lens.

32. A computer-implemented method for determining data related to refractive values from a spectacle lens prescription document, the method comprising a step of:

determining data related to values from the at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the method is further containing a step of validating a content of the data related to the refractive values, and wherein validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range.

33. The method according to claim 32, the method further comprising a step of at least one of:

validating the electronic representation of the at least one spectacle lens prescription document based on its quality, wherein the quality refers to a readability of the electronic representation of the at least one spectacle lens prescription document;

classifying the at least one spectacle lens prescription document into one of at least two classes, wherein each class refers to a different type of spectacle lens prescription document, wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document;

training the determining of the text containing the data related to the refractive values;

training the determining of the at least one pattern containing the data related to the refractive values;

training the validating of the quality of the electronic representation of the at least one spectacle lens prescription document;

training the classifying of the at least one spectacle lens prescription document into one of at least two classes, wherein each class refers to a different type of spectacle lens prescription document; and training the validating of the content of the data related to the refractive values.

34. The method according to claim 33, wherein the electronic representation of the at least one spectacle lens prescription document is provided in format of at least one of an image file or a portable document format, and wherein validating of the content of the data related to the refractive values further comprises ascertaining whether a particular piece of metadata corresponds to an expected format and content.

35. A computer-implemented method for processing at least one spectacle lens prescription document, comprising the following steps:

receiving an electronic representation of at least one spectacle lens prescription document containing data related to refractive values;

determining the data related to the refractive values from the spectacle lens prescription document according to claim 31;

providing the data related to the refractive values for further processing.

36. A computer program stored on a non-transitory storage medium and comprising instructions which, when the program is executed by a computer, cause the computer to carry out a step of:

determining data related to values from the at least one document by determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein a content of the data related to the refractive values is validated, and wherein validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range.

37. A method for producing at least one spectacle lens, wherein the producing the at least one spectacle lens comprises processing at least one lens blank by using data related to refractive values as determined by carrying out a step of:

determining data related to values from at least one document by determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein a content of the data related to the refractive values is validated, and wherein validating of the content of the data related to the refractive values includes at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range.

38. A processing device for determining data related to refractive values from at least one spectacle lens prescription document, wherein the processing device is configured to:

determine at least one pattern containing the data related to the values from an electronic representation of at least one document; and determine text containing the data related to the values from the electronic representation of the at least one document, wherein the processing device is configured to determine the data related to the values by identifying and using a surface distribution of the at least one pattern containing the data related to the values over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the processing device is further configured to classify the at least one spectacle lens prescription document into one of at least two classes, wherein each class refers to a different type of spectacle lens prescription document, and wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document.

39. The processing device according to claim 38, wherein the values are for the purpose of producing at least one spectacle lens.

40. The processing device according to claim 38, wherein the refractive values correspond to at least one refractive error of at least one eye of a person.

41. The processing device according to claim 38, wherein the at least one pattern is a particular structure on the surface of the at least one spectacle lens prescription document which is identified by the processing device at a particular location on at least one page or a portion of the at least one page of the at least one spectacle lens prescription document.

42. The processing device according to claim 38, wherein the data related to the refractive values contains a first sequence of refractive values assigned to a right spectacle lens and a second sequence of refractive values assigned to a left spectacle lens.

43. The processing device according to claim 42, wherein each sequence of the refractive values contains a first value related to a sphere, a second value related to a cylinder, and a third value related to an axis of the corresponding spectacle lens, and wherein each sequence of the refractive values contains the refractive values in an order of the first value related to the sphere followed by the second value related to the cylinder followed by the third value related to the axis of the corresponding spectacle lens.

44. The processing device according to claim 42, wherein the processing device is configured to identify and use the surface distribution of at least one first pattern containing the first sequence of the refractive values assigned to the right spectacle lens and of at least one second pattern containing the second sequence of the refractive values assigned to the left spectacle lens over the electronic representation of the at least one spectacle lens prescription document.

45. The processing device according to claim 44, wherein the refractive values in each sequence are arranged:

in a horizontal fashion on the electronic representation of the at least one spectacle lens prescription document, wherein the first pattern containing the first sequence of the refractive values assigned to the right spectacle lens is arranged above the second pattern containing the second sequence of the refractive values assigned to the left spectacle lens; or in a vertical fashion on the electronic representation of the at least one spectacle lens prescription document, wherein the first pattern containing the first sequence of the refractive values assigned to the right spectacle lens is arranged left to the second pattern containing the second sequence of the refractive values assigned to the left spectacle lens.

46. The processing device according to claim 42, wherein each sequence of the refractive values contains a first set of refractive values assigned to far vision and a second set of refractive values assigned to near vision.

47. The processing device according to claim 38, wherein the data related to the refractive values further contains at least one piece of metadata, and wherein the at least one piece of metadata is selected from at least one of:

an issuance date of the refractive values;

an expiration date of the refractive values;

at least one piece of imprint information about an issuer of the refractive values; and a signature of an issuer of the refractive values.

48. The processing device according to claim 38, wherein the processing device is further configured to at least one of:

validate the electronic representation of the at least one spectacle lens prescription document based on its quality, wherein the quality refers to a readability of the electronic representation of the at least one spectacle lens prescription document; and validate a content of the data related to the refractive values.

49. A system for processing at least one spectacle lens prescription document, the system comprising:

at least one input interface configured to receive an electronic representation of at least one spectacle lens prescription document;

a processing device according to claim 38; and at least one output interface configured to provide the data related to the refractive values to a recipient, wherein the processing device is configured to provide the at least one piece of data related to the refractive values in form of a structured output file to the at least one output interface, wherein the structured output file is a file in which the pieces of data follow a predefined arrangement in order to facilitate further processing of the output file by the recipient, and wherein the recipient is a data processing system operating a manufacturing unit for producing the at least one spectacle lens.

50. A computer-implemented method for determining data related to refractive values from a spectacle lens prescription document, the method comprising a step of:

determining data related to values from the at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the method is further comprising a step of classifying the at least one spectacle lens prescription document into one of at least two classes, wherein each class refers to a different type of spectacle lens prescription document, and wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document.

51. The method according to claim 50, the method further comprising a step of at least one of:

validating the electronic representation of the at least one spectacle lens prescription document based on its quality, wherein the quality refers to a readability of the electronic representation of the at least one spectacle lens prescription document;

validating a content of the data related to the refractive values;

training the determining of the text containing the data related to the refractive values;

training the determining of the at least one pattern containing the data related to the refractive values;

training the validating of the quality of the electronic representation of the at least one spectacle lens prescription document;

training the classifying of the at least one spectacle lens prescription document into one of at least two classes, wherein each class refers to a different type of spectacle lens prescription document; and training the validating of the content of the data related to the refractive values.

52. The method according to claim 51, wherein the validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range, wherein the electronic representation of the at least one spectacle lens prescription document is provided in format of at least one of an image file or a portable document format, and wherein validating of the content of the data related to the refractive values includes ascertaining whether a particular piece of metadata corresponds to an expected format and content.

53. A computer-implemented method for processing at least one spectacle lens prescription document, comprising the following steps:

receiving an electronic representation of at least one spectacle lens prescription document containing data related to refractive values;

determining the data related to the refractive values from the spectacle lens prescription document according to claim 50; and providing the data related to the refractive values for further processing.

54. A computer program stored on a non-transitory storage medium and comprising instructions which, when the program is executed by a computer, cause the computer to carry out a step of:

determining data related to values from the at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the method is further comprising a step of classifying the at least one spectacle lens prescription document into one of at least two classes, wherein each class refers to a different type of spectacle lens prescription document, and wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document.

55. A method for producing at least one spectacle lens, wherein the producing the at least one spectacle lens comprises processing at least one lens blank by using data related to refractive values as determined by carrying out a step of:

determining data related to values from at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the electronic representation of the at least one document, wherein the surface distribution is a spatial arrangement of the at least one pattern on the surface of the at least one document with regard to a location of each pattern on at least a portion of the at least one document, wherein the values are refractive values and the document is a spectacle lens prescription document, wherein the method further comprises a step of classifying the at least one spectacle lens prescription document into one of at least two classes, and wherein each class refers to a different type of spectacle lens prescription document, wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document.

56. A processing device for determining data related to refractive values from at least one spectacle lens prescription document, wherein the processing device is configured to:

determine at least one pattern containing data related to values from an electronic representation of at least one document; and determine text containing the data related to the values from the electronic representation of the at least one document, wherein the processing device is configured to determine the data related to the values by identifying and using a surface distribution of the at least one pattern containing the data related to the values over the at least one document, wherein the surface distribution is a spatial arrangement of the at least one pattern on the surface of the at least one document with regard to a location of each pattern on at least a portion of the at least one document, wherein the at least one pattern is a particular structure on the surface of the at least one document, wherein the values are refractive values and the document is a spectacle lens prescription document, and wherein the particular structure on the surface of the at least one spectacle lens prescription document is identified by the processing device at a particular location on at least one page or a portion of the at least one page of the at least one spectacle lens prescription document.

57. The processing device according to the claim 56, wherein the data related to the refractive values contains a first sequence of refractive values assigned to a right spectacle lens and a second sequence of refractive values assigned to a left spectacle lens.

58. The processing device according to the claim 57, wherein each sequence of the refractive values contains a first value related to a sphere, a second value related to a cylinder, and a third value related to an axis of the corresponding spectacle lens, and wherein each sequence of the refractive values contains the refractive values in an order of the first value related to the sphere followed by the second value related to the cylinder followed by the third value related to the axis of the corresponding spectacle lens.

59. The processing device according to the claim 57, wherein the processing device is configured to identify and use the surface distribution of at least one first pattern containing the first sequence of the refractive values assigned to the right spectacle lens and of at least one second pattern containing the second sequence of the refractive values assigned to the left spectacle lens over the at least one spectacle lens prescription document.

60. The processing device according to the claim 59, wherein the refractive values in each sequence are arranged:

in a horizontal fashion on the at least one spectacle lens prescription document, wherein the first pattern containing the first sequence of the refractive values assigned to the right spectacle lens is arranged above the second pattern containing the second sequence of the refractive values assigned to the left spectacle lens; or in a vertical fashion on the at least one spectacle lens prescription document, wherein the first pattern containing the first sequence of the refractive values assigned to the right spectacle lens is arranged left to the second pattern containing the second sequence of the refractive values assigned to the left spectacle lens.

61. The processing device according to the claim 57, wherein each sequence of the refractive values contains a first set of refractive values assigned to far vision and a second set of refractive values assigned to near vision.

62. The processing device according to the claim 56, wherein the data related to the refractive values further contains at least one piece of metadata, and wherein the at least one piece of metadata is selected from at least one of:

an issuance date of the refractive values;

an expiration date of the refractive values;

at least one piece of imprint information about an issuer of the refractive values; and a signature of an issuer of the refractive values.

63. The processing device according to the claim 56, wherein the processing device is further configured to at least one of:

evaluate a quality of the electronic representation of the at least one spectacle lens prescription document, wherein the quality refers to a readability of the electronic representation of the at least one spectacle lens prescription document;

classify the at least one spectacle lens prescription document into one of at least two classes, wherein each class refers to a different type of spectacle lens prescription document, wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document; and validate a content of the data related to the refractive values.

64. A system for processing at least one spectacle lens prescription document, the system comprising:

at least one input interface configured to receive an electronic representation of at least one spectacle lens prescription document;

a processing device according to claim 1; and at least one output interface configured to provide the data related to the refractive values, wherein the processing device is configured to provide the at least one piece of data related to the refractive values in a format of a structured output file to the at least one output interface, wherein the structured output file refers to a file in which the pieces of data follow a predefined arrangement in order to facilitate further processing of the output file by the recipient, and wherein the recipient is a data processing system operating a manufacturing unit for producing the at least one spectacle lens.

65. A computer-implemented method for determining data related to refractive values from a spectacle lens prescription document for a purpose of producing at least one spectacle lens, the method comprising a step of:

determining data related to values from the at least one document by determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the at least one document, wherein the surface distribution is a spatial arrangement of the at least one pattern on the surface of the at least one document with regard to a location of each pattern on at least a portion of the at least one document, wherein the at least one pattern is a particular structure on the surface of the at least one document, wherein the values are refractive values and the document is a spectacle lens prescription document, and wherein the particular structure on the surface of the at least one spectacle lens prescription document is identified by the processing device at a particular location on at least one page or a portion of the at least one page of the at least one spectacle lens prescription document.

66. The method according to claim 65, the method further comprising a step of at least one of:

evaluating a quality of the electronic representation of the at least one spectacle lens prescription document, wherein the quality refers to a readability of the electronic representation of the at least one spectacle lens prescription document;

classifying the at least one spectacle lens prescription document into one of at least two classes, wherein each class refers to a different type of spectacle lens prescription document, wherein the type of spectacle lens prescription document is selected from one of:

a machine written spectacle lens prescription document in table format;

a machine written spectacle lens prescription document without the table format;

a machine written spectacle lens prescription document having at least one data field which contains at least one piece of data in a handwritten manner; and a handwritten spectacle lens prescription document;

validating a content of the data related to the refractive values;

training the determining of the text containing the data related to the refractive values;

training the determining of the at least one pattern containing the data related to the refractive values;

training the evaluating of the quality of the electronic representation of the at least one spectacle lens prescription document;

training the classifying of the at least one spectacle lens prescription document into one of at least two classes, wherein each class refers to a different type of spectacle lens prescription document; and training the validating of the content of the data related to the refractive values.

67. The method according to claim 66, wherein the validating of the content of the data related to the refractive values comprises at least one of:

ascertaining whether a particular refractive value falls within a first predefined range;

ascertaining whether a particular refractive value is a multiple of a predefined value;

ascertaining whether a further particular refractive value falls within a second predefined range in an event in which the particular refractive value falls within the first predefined range; and ascertaining whether a difference between two particular refractive values falls within a third predefined range, wherein the electronic representation of the at least one spectacle lens prescription document is provided in a format of at least one of an image file or a portable document format, and wherein validating of the content of the data related to the refractive values includes ascertaining whether a particular piece of metadata corresponds to an expected format and content.

68. A computer program stored on a non-transitory storage medium and comprising instructions which, when the program is executed by a computer, cause the computer for a purpose of producing at least one spectacle lens to carry out a step of:

determining data related to values from at least one document by:

determining at least one pattern containing the data related to the values from an electronic representation of the at least one document; and determining text containing the data related to refractive values from the electronic representation of the at least one document, wherein the data related to the values are determined by identifying and using a surface distribution of the at least one pattern over the at least one document, wherein the surface distribution is a spatial arrangement of the at least one pattern on the surface of the at least one document with regard to a location of each pattern on at least a portion of the at least one document, wherein the at least one pattern is a particular structure on the surface of the at least one document, wherein the values are refractive values and the document is a spectacle lens prescription document, and wherein the particular structure on the surface of the at least one spectacle lens prescription document is identified by the processing device at a particular location on at least one page or a portion of the at least one page of the at least one spectacle lens prescription document.

69. A method for producing at least one spectacle lens, wherein the producing the at least one spectacle lens comprises processing at least one lens blank by using data related to refractive values as determined by carrying out a step of:

determining data related to values from at least one document by:

determining at least one pattern containing the data related to the values from an electronic representation of the at least one document; and determining text containing the data related to the values from the electronic representation of the at least one document, wherein the data related to the values are determined by identifying and using a surface distribution of the at least one pattern over the at least one document, wherein the surface distribution is a spatial arrangement of the at least one pattern on the surface of the at least one document with regard to a location of each pattern on at least a portion of the at least one document, wherein the at least one pattern is a particular structure on the surface of the at least one document, wherein the values are refractive values and the document is a spectacle lens prescription document, and wherein the particular structure on the surface of the at least one spectacle lens prescription document is identified by the processing device at a particular location on at least one page or a portion of the at least one page of the at least one spectacle lens prescription document.

* * * * *